(12) United States Patent
Malik et al.

(10) Patent No.: US 10,541,851 B2
(45) Date of Patent: Jan. 21, 2020

(54) SYNCHRONIZATION SIGNAL BLOCK SIGNALING FOR WIRELESS COMMUNICATIONS IN SHARED SPECTRUM

(71) Applicant: QUALCOMM Incorporated, San Diego, CA (US)

(72) Inventors: Rahul Malik, San Diego, CA (US); Aleksandar Damnjanovic, Del Mar, CA (US); Andrei Dragos Radulescu, San Diego, CA (US); Srinivas Yerramalli, San Diego, CA (US); Tamer Kadous, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/975,207

(22) Filed: May 9, 2018

(65) Prior Publication Data

US 2018/0343156 A1 Nov. 29, 2018

Related U.S. Application Data

(60) Provisional application No. 62/511,188, filed on May 25, 2017.

(51) Int. Cl.
*H04L 27/26* (2006.01)
*H04J 11/00* (2006.01)
(Continued)

(52) U.S. Cl.
CPC ...... *H04L 27/2665* (2013.01); *H04J 11/0073* (2013.01); *H04J 11/0076* (2013.01); *H04L 5/0048* (2013.01); *H04W 76/10* (2018.02)

(58) Field of Classification Search
CPC ............... H04L 27/2665; H04L 5/0048; H04L 12/2856; H04L 7/10; H04L 2025/03656;
(Continued)

(56) References Cited

U.S. PATENT DOCUMENTS

2017/0325260 A1* 11/2017 Guo ...................... H04L 5/0007
2018/0176067 A1*  6/2018 Luo ........................ H04W 56/00
(Continued)

FOREIGN PATENT DOCUMENTS

WO WO-2017011802 A1 1/2017
WO WO 2018/141981 * 2/2018 ............... H04B 7/08

OTHER PUBLICATIONS

International Search Report and Written Opinion—PCT/US2018/032129—ISA/EPO—dated Jul. 31, 2018.

*Primary Examiner* — Warner Wong
(74) *Attorney, Agent, or Firm* — Liem T. Do

(57) ABSTRACT

Methods, systems, and devices for wireless communication are described. A base station may perform an access procedure to obtain access to a shared radio frequency spectrum band during a measurement window and generate a synchronization signal (SS) burst comprising a plurality of SS blocks. The base station may perform a beam sweeping first transmission of the SS burst over the shared radio frequency spectrum based at least in part on the access procedure. In the first transmission or a second transmission, the base station may transmit at least one of a first indication of a time of access to the shared radio frequency spectrum band with respect to the measurement window, a second indication of a transmission beam associated with the SS block, and a third indication of a quantity of remaining SS blocks from the plurality of SS blocks to follow the SS block in the measurement window.

30 Claims, 16 Drawing Sheets

(51) Int. Cl.
*H04L 5/00* (2006.01)
*H04W 76/10* (2018.01)

(58) Field of Classification Search
CPC . H04L 41/08; H04L 41/0803; H04L 41/0806; H04L 29/06326; H04L 65/1609; H04J 11/0076; H04J 11/0073; H04W 48/16; H04W 76/00; H04W 76/10; H04W 76/45
See application file for complete search history.

(56) References Cited

U.S. PATENT DOCUMENTS

| | | | |
|---|---|---|---|
| 2018/0198575 A1* | 7/2018 | Sheng | H04J 11/0069 |
| 2018/0198585 A1* | 7/2018 | Lin | H04L 5/005 |
| 2018/0206272 A1* | 7/2018 | Maaref | H04L 5/0048 |
| 2018/0213493 A1* | 7/2018 | Chakraborty | H04W 56/001 |
| 2018/0220360 A1* | 8/2018 | Sheng | H04J 11/0073 |
| 2018/0227866 A1* | 8/2018 | Jung | H04W 56/001 |
| 2018/0242223 A1* | 8/2018 | Chendamarai Kannan | H04W 48/08 |
| 2018/0278314 A1* | 9/2018 | Nam | H04B 7/0413 |
| 2018/0278356 A1* | 9/2018 | Zhou | H04L 5/005 |
| 2018/0287728 A1* | 10/2018 | Ly | H04J 11/0079 |
| 2018/0288755 A1* | 10/2018 | Liu | H04L 5/005 |
| 2018/0302182 A1* | 10/2018 | Ly | H04L 5/0023 |
| 2018/0324022 A1* | 11/2018 | Sheng | H04L 5/0094 |
| 2018/0324023 A1* | 11/2018 | Zeng | H04J 11/0076 |
| 2018/0324720 A1* | 11/2018 | Ly | H04W 56/001 |
| 2018/0324721 A1* | 11/2018 | Hakola | H04L 5/0053 |
| 2018/0324804 A1* | 11/2018 | Aiba | H04W 72/0453 |
| 2018/0331879 A1* | 11/2018 | Yang | H04L 5/0044 |
| 2018/0343595 A1* | 11/2018 | da Silva | H04J 11/0073 |
| 2019/0140801 A1* | 5/2019 | Ko | H04L 5/005 |
| 2019/0159165 A1* | 5/2019 | Agiwal | H04W 68/005 |
| 2019/0159264 A1* | 5/2019 | Zhang | H04W 74/0833 |
| 2019/0254077 A1* | 8/2019 | Sahlin | H04L 5/0028 |

\* cited by examiner

SYNCHRONIZATION SIGNAL BLOCK SIGNALING FOR WIRELESS COMMUNICATIONS IN SHARED SPECTRUM

CROSS REFERENCES

The present application for patent claims priority to U.S. Provisional Patent Application No. 62/511,188 by Malik, et al., entitled "Synchronization Signal Block Signaling For Wireless Communications in Shared Spectrum," filed May 25, 2017, assigned to the assignee hereof.

BACKGROUND

The following relates generally to wireless communication, and more specifically to synchronization signal block signaling for wireless communications in shared spectrum.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) or 5G system). In some examples, wireless multiple-access communications system may include a number of base stations or access network nodes, each simultaneously supporting communication for multiple communication devices, which may be otherwise known as user equipment (UE). In a LTE or LTE-Advanced (LTE-A) networks, a set of one or more base stations may define an eNodeB (eNB). In other examples (e.g., in a NR or 5G network), a wireless multiple access communication system may include a number of smart radio heads (RHs) in communication with a number of access node controllers (ANCs), where a set of one or more RHs, in communication with an ANC, defines a base station (e.g., an eNB or gNB). A base station may communicate with a set of UEs on downlink (DL) channels (e.g., for transmissions from a base station to a UE) and uplink (UL) channels (e.g., for transmissions from a UE to a base station).

A base station and a UE may exchange various messages during a cell acquisition procedure to establish a communication link. In some cases, a base station may utilize beamformed transmissions during the cell acquisition procedure to mitigate path losses (e.g., if the base station is communicating at higher frequencies). A UE that includes multiple antennas may receive transmissions from a base station using various antenna configurations to determine a transmission beam and antenna configuration suitable for future communications. In shared or unlicensed radio frequency spectrum, some regulated domains require base stations to perform channel sensing before accessing the channel. The base station performs a clear channel assessment (CCA) to determine a time to transmit in the shared or unlicensed radio frequency spectrum. This results in asynchronous transmissions across multiple base stations.

In some cases, a UE may perform an initial access (or initial acquisition) procedure to gain access to a wireless network. As part of the initial access procedure, the UE may search for a synchronization channel transmitted by a network access device, such as a base station, of the wireless network. The UE may be configured to periodically listen for a synchronization channel from the base station. UEs operating in licensed radio frequency spectrum bands may combine multiple received synchronization signal (SS) blocks of a synchronization channel to demodulate the received signal. UEs operating in a shared radio frequency spectrum band, such as an unlicensed radio frequency spectrum band, may be unable to combine multiple SS blocks due to the asynchronous nature of shared radio frequency spectrum band transmissions. As such, UEs operating in shared radio frequency spectrum bands may perform single-shot detection and demodulation of a single received SS block. Existing systems do not provide a mechanism for UEs to reliably perform single-shot detection and demodulation of SS blocks.

SUMMARY

The described techniques relate to improved methods, systems, devices, or apparatuses that support synchronization signal (SS) block signaling over a shared radio frequency spectrum band, such as an unlicensed radio frequency spectrum band.

In some wireless communications systems, base stations may use beam sweeping to transmit a burst set of SS blocks, with each SS block in the burst set being transmitted on a different beam. Different base stations may synchronize the transmission of SS blocks such that the same SS blocks are scheduled for transmission at the same time by each base station. Nevertheless, different base stations may gain access to a shared radio frequency band at different times during a measurement window. Based on the constraints of inter-base station synchronization, the first SS block transmitted by a base station after gaining access to the medium may be a function of the time at which the base station gained access to the medium. This inconsistency in the starting SS block or transmission beam of an SS burst set may make it difficult for a user equipment (UE) detecting the SS block to determine how long to continue listening for SS transmissions by the base station.

The techniques of this disclosure provide a way for a base station to indicate to a UE performing synchronization, for each SS block transmitted, one or more of the following parameters: a time of base station access to the shared radio frequency spectrum band with respect to a timing of the current measurement window, a current beam associated with the SS block, and a remaining number of SS blocks to be transmitted in the current burst set. One or more of these parameters are indicated to the UE in each SS block or as a separate signal tied to one or more individual SS blocks. In addition, the base station may use a mode of operation in which a complete SS burst set is transmitted during a single medium access by the base station. When operating in this mode, the communication of the above described parameters, may advantageously enable a UE detecting an SS block to determine the relative position of that SS block within an SS burst set. With this information, the UE may determine a remaining length of the SS burst set transmitted by the base station and perform SS block detection accordingly.

A method of wireless communication is described. The method may include performing, by a base station, an access procedure to obtain access to a shared radio frequency spectrum band during a measurement window, generating an SS burst comprising a plurality of SS blocks, and performing, by the base station, a beam sweeping first transmission of the SS burst over the shared radio frequency spectrum based on the access procedure. In some cases, each SS block of the SS burst is transmitted during the first transmission using a different transmission beam. In some cases, one of the first transmission, a second transmission by the base station, or a combination thereof comprises: a first indication of a time of access to the shared radio frequency spectrum band with respect to the measurement window, a second indication of a transmission beam associated with the SS block, and a third indication of a quantity of remaining SS blocks from the plurality of SS blocks to follow the SS block in the measurement window.

An apparatus for wireless communication is described. The apparatus may include means for performing, by a base station, an access procedure to obtain access to a shared radio frequency spectrum band during a measurement window, means for generating an SS burst comprising a plurality of SS blocks, and performing, by the base station, a beam sweeping first transmission of the SS burst over the shared radio frequency spectrum based on the access procedure. In some cases, each SS block of the SS burst is transmitted during the first transmission using a different transmission beam. In some cases, one of the first transmission, a second transmission by the base station, or a combination thereof comprises: a first indication of a time of access to the shared radio frequency spectrum band with respect to the measurement window, a second indication of a transmission beam associated with the SS block, and a third indication of a quantity of remaining SS blocks from the plurality of SS blocks to follow the SS block in the measurement window.

Another apparatus for wireless communication is described. The apparatus may include a processor, memory in electronic communication with the processor, and instructions stored in the memory. The instructions may be operable to cause the processor to perform, by a base station, an access procedure to obtain access to a shared radio frequency spectrum band during a measurement window, generate an SS burst comprising a plurality of SS blocks, and performing, by the base station, a beam sweeping first transmission of the SS burst over the shared radio frequency spectrum based on the access procedure. In some cases, each SS block of the SS burst is transmitted during the first transmission using a different transmission beam. In some cases, one of the first transmission, a second transmission by the base station, or a combination thereof comprises: a first indication of a time of access to the shared radio frequency spectrum band with respect to the measurement window, a second indication of a transmission beam associated with the SS block, and a third indication of a quantity of remaining SS blocks from the plurality of SS blocks to follow the SS block in the measurement window.

A non-transitory computer readable medium for wireless communication is described. The non-transitory computer-readable medium may include instructions operable to cause a processor to perform, by a base station, an access procedure to obtain access to a shared radio frequency spectrum band during a measurement window, generate an SS burst comprising a plurality of SS blocks, and performing, by the base station, a beam sweeping first transmission of the SS burst over the shared radio frequency spectrum based on the access procedure. In some cases, each SS block of the SS burst is transmitted during the first transmission using a different transmission beam. In some cases, one of the first transmission, a second transmission by the base station, or a combination thereof comprises: a first indication of a time of access to the shared radio frequency spectrum band with respect to the measurement window, a second indication of a transmission beam associated with the SS block, and a third indication of a quantity of remaining SS blocks from the plurality of SS blocks to follow the SS block in the measurement window.

Some examples of the method, apparatus, and non-transitory computer-readable medium described above may further include processes, features, means, or instructions for transmitting all SS blocks of the SS burst during the measurement window.

Some examples of the method, apparatus, and non-transitory computer-readable medium described above may further include processes, features, means, or instructions for transmitting all SS blocks of a SS burst-set during the measurement window.

Some examples of the method, apparatus, and non-transitory computer-readable medium described above may further include processes, features, means, or instructions for determining a chronological burst-set number based on a timing of the access procedure and a beginning of the measurement window. In some cases, the first indication comprises the chronological burst-set number.

In some examples of the method, apparatus, and non-transitory computer-readable medium described above, the first indication may be constant for all SS blocks of the SS burst. In some examples of the method, apparatus, and non-transitory computer-readable medium described above, the second indication comprises a beam index of the transmission beam.

Some examples of the method, apparatus, and non-transitory computer-readable medium described above may further include processes, features, means, or instructions for determining a beam index of a sequentially first transmission beam used for a sequentially first SS block transmission after obtaining access to the shared radio frequency spectrum band, the beam index determined based on a timing of the access procedure and a beginning of the measurement window.

In some examples of the method, apparatus, and non-transitory computer-readable medium described above, the third indication comprises the beam index of the sequentially first transmission beam. In some examples of the method, apparatus, and non-transitory computer-readable medium described above, the third indication may be constant for all SS blocks of the SS burst.

In some examples of the method, apparatus, and non-transitory computer-readable medium described above, each SS block of the SS burst comprises a physical broadcast channel comprising one of the first indication, the second indication, the third indication, or a combination thereof.

In some examples of the method, apparatus, and non-transitory computer-readable medium described above, the second transmission comprises a minimum system information associated with the SS burst.

A method of wireless communication is described. The method may include monitoring, by a UE, a shared radio frequency spectrum band during a measurement window for an SS burst, receiving from a base station a beam sweeping first transmission over the shared radio frequency spectrum band, the first transmission comprising an SS block of the SS burst, and performing a synchronization procedure with a base station based on the received first SS block. In some cases, one of the first transmission, a second transmission received from the base station, or a combination thereof comprises: a first indication of a time of access to the shared radio frequency spectrum band with respect to the measurement window, a second indication of a transmission beam associated with the SS block, and a third indication of a quantity of remaining SS blocks from the plurality of SS blocks to follow the SS block in the measurement window.

An apparatus for wireless communication is described. The apparatus may include means for monitoring, by a UE, a shared radio frequency spectrum band during a measurement window for an SS burst, means for receiving from a base station a beam sweeping first transmission over the shared radio frequency spectrum band, the first transmission comprising an SS block of the SS burst, and means for performing a synchronization procedure with a base station based on the received first SS block. In some cases, one of the first transmission, a second transmission received from the base station, or a combination thereof comprises: a first indication of a time of access to the shared radio frequency spectrum band with respect to the measurement window, a second indication of a transmission beam associated with the SS block, and a third indication of a quantity of remaining SS blocks from the plurality of SS blocks to follow the SS block in the measurement window.

Another apparatus for wireless communication is described. The apparatus may include a processor, memory in electronic communication with the processor, and instructions stored in the memory. The instructions may be operable to cause the processor to monitor, by a UE, a shared radio frequency spectrum band during a measurement window for an SS burst, receive from a base station a beam sweeping first transmission over the shared radio frequency spectrum band, the first transmission comprising an SS block of the SS burst, and perform a synchronization procedure with a base station based on the received first SS block. In some cases, one of the first transmission, a second transmission received from the base station, or a combination thereof comprises: a first indication of a time of access to the shared radio frequency spectrum band with respect to the measurement window, a second indication of a transmission beam associated with the SS block, and a third indication of a quantity of remaining SS blocks from the plurality of SS blocks to follow the SS block in the measurement window.

A non-transitory computer readable medium for wireless communication is described. The non-transitory computer-readable medium may include instructions operable to cause a processor to monitor, by a UE, a shared radio frequency spectrum band during a measurement window for an SS burst, receive from a base station a beam sweeping first transmission over the shared radio frequency spectrum band, the first transmission comprising an SS block of the SS burst, and perform a synchronization procedure with a base station based on the received first SS block. In some cases, one of the first transmission, a second transmission received from the base station, or a combination thereof comprises: a first indication of a time of access to the shared radio frequency spectrum band with respect to the measurement window, a second indication of a transmission beam associated with the SS block, and a third indication of a quantity of remaining SS blocks from the plurality of SS blocks to follow the SS block in the measurement window.

Some examples of the method, apparatus, and non-transitory computer-readable medium described above may further include processes, features, means, or instructions for receiving some SS blocks of the SS burst during the measurement window.

In some examples of the method, apparatus, and non-transitory computer-readable medium described above, the first indication comprises a chronological burst-set number based on a timing of the access procedure and a beginning of the measurement window.

In some examples of the method, apparatus, and non-transitory computer-readable medium described above, the first indication may be constant for all SS blocks of the SS burst. In some examples of the method, apparatus, and non-transitory computer-readable medium described above, the second indication comprises a beam index of the transmission beam.

In some examples of the method, apparatus, and non-transitory computer-readable medium described above, the third indication comprises a beam index of a sequentially first transmission beam used for a sequentially first SS block transmission in the burst.

Some examples of the method, apparatus, and non-transitory computer-readable medium described above may further include processes, features, means, or instructions for determining the quantity of remaining SS blocks from the plurality of SS blocks to follow the SS block in the measurement window, based on the second indication and the beam index of the sequentially first transmission beam.

In some examples of the method, apparatus, and non-transitory computer-readable medium described above, the third indication may be constant for all SS blocks of the SS burst. In some examples of the method, apparatus, and non-transitory computer-readable medium described above, each SS block of the SS burst comprises a physical broadcast channel comprising one of the first indication, the second indication, the third indication, or a combination thereof.

In some examples of the method, apparatus, and non-transitory computer-readable medium described above, the second transmission comprises a minimum system information associated with the SS burst.

DETAILED DESCRIPTION

Figure 1:
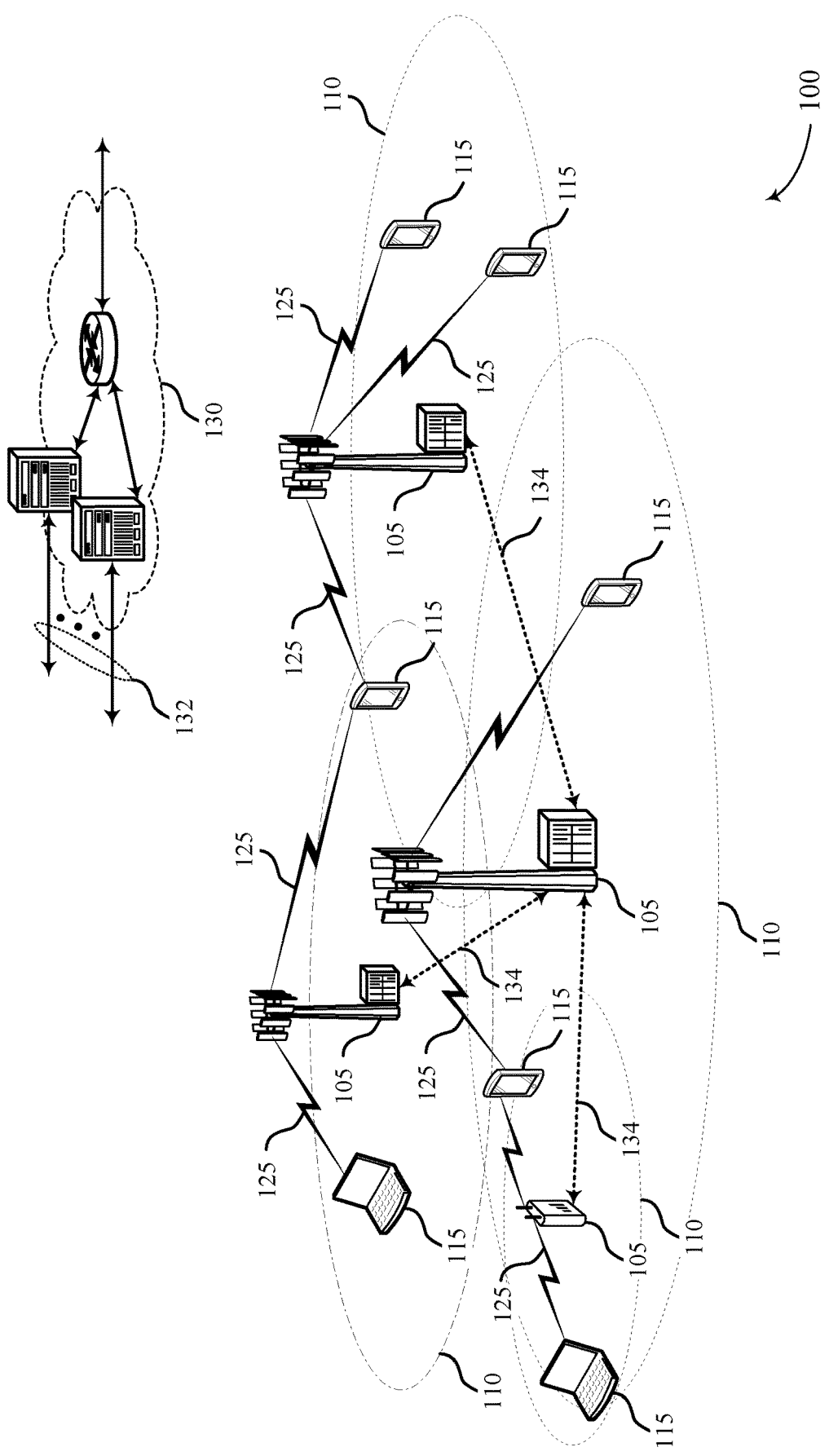
FIG. 1 illustrates an example of a system for wireless communication that supports synchronization signal block signaling for wireless communications in shared spectrum in accordance with aspects of the present disclosure.

A base station may transmit a signal to a user equipment (UE) using multiple transmission beams, and the UE may receive the beams using different sets of antenna sub-arrays, also referred to as panels. The UE may cycle through panels while receiving synchronization signal (SS) bursts to select a panel for use in communications with the base station. However, in a shared radio frequency spectrum band, such as an unlicensed radio frequency spectrum band, due to the aperiodic nature of channel acquisition, SS block detection by a UE can be aided by augmenting the information transmitted in the SS bursts. Thus, the present disclosure describes techniques for providing SS block signaling to a UE of a wireless communications system operating in a shared radio frequency spectrum band.

In some wireless communications systems, a base station and UE respectively use beam sweeping and beam searching during initial acquisition procedures to select a beam for establishing a link between the UE and the base station. Beam sweeping and beam searching can also be used to maintain the link between the UE and the base station in the form of a reference signal. In licensed New Radio (NR) systems, the base station may transmit SS blocks in an SS burst set which is defined as a sweep of the SS block across space. Therefore, the base station can maintain a certain number of beams or can transmit a certain number of beams at a given time. The base station may span through those directions, and may transmit an SS block for each beam. The SS block includes information that may be transmitted for the purpose of synchronization along each beam. The SS burst set can be broken up into multiple SS bursts. An SS block may be the smallest autonomous unit of synchronization information, and multiple SS blocks (or multiple directions) may make up an SS burst. One or more SS bursts may make up an SS burst set. Thus, an SS burst set includes an aggregation of multiple SS blocks covering all directions.

An SS block may include a primary synchronization signal (PSS), secondary synchronization signal (SSS), and physical broadcast channel (PBCH) transmissions. The SS burst set windows for multiple neighboring base stations belonging to the same operator or operating on the same frequencies may be synchronized to allow for UEs to perform effective cell selection and reselection.

In a shared radio frequency spectrum band, such as an unlicensed radio frequency spectrum band, base stations perform a listen-before-talk (LBT) clear channel assessment (CCA) procedure to sense when a channel is clear for transmission. During a measurement window, different base stations may gain access to the channel at different times, and may therefore begin SS burst set transmissions at different times, resulting in asynchronous SS burst set transmissions. This use of the CCA procedure, may constrain the UE to use single shot SS detection techniques. In other words, the UE may not be able to combine received SS blocks from two different measurement windows to improve demodulation performance because of the uncertainty around when the base station will regain access to the channel for a second transmission of the SS burst set.

Neighboring base stations or base stations with the same operator or carrier frequencies may synchronize their measurement windows or measurement periods for SS burst transmissions. When a UE first attempts to synchronize with a base station on the channel, the UE has no notion of the boundary of the measurement period and/or measurement window.

Moreover, because different base stations may synchronize the transmission of SS blocks such that the same SS blocks are scheduled for transmission at the same time by each base station. Nevertheless, different base stations may gain access to a shared radio frequency band at different times during a measurement window. Based on the constraints of inter-base station synchronization, the first SS block transmitted by a base station after gaining access to the medium may be a function of the time at which the base station gained access to the medium. This inconsistency and unpredictability of the starting SS block or transmission beam of an SS burst set from a base station may make it difficult for a UE detecting an SS block to determine how long to continue listening for SS transmissions from the base station.

This disclosure proposes techniques for improving the efficacy of SS burst set transmissions in a shared radio frequency spectrum band. According to these techniques, a base station may be configured to complete a transmission of an SS burst set in a single medium access. In addition, the information carried by the SS block may be augmented by one or more indicators which may be transmitted as part of the individual SS blocks or as separate signals that are associated with individual SS blocks. The indicators may be used by the UE to determine a start of a measurement period and a remaining amount of time in an SS burst set transmission.

For example, the first indicator may communicate a timing of access by the base station to a channel of the shared radio frequency spectrum band with respect to the start of the current measurement window. In some examples the first indicator may include a current number of SS burst sets since the start of a measurement window. The first indicator may be constant in all SS blocks of a given SS burst set transmission, and may be embedded in the PBCH or in the minimum system information tied to the current burst. The second indicator may include the current beam index associated with an individual SS block transmission. The current beam index may be variable across each SS block in the SS burst set transmission. The third indicator may include the remaining number of SS blocks to be transmitted in the current SS burst set transmission. In one example, the third indicator may include a starting beam index for the current SS burst set used for the sequentially first SS block transmission after the base station gained access to the channel during the current measurement window. For example, the third indicator may include a starting beam index for the SS block that was initially transmitted in the current SS burst set once the base station gained access to the channel during the current measurement window— that is, for example, if the base station gained access to the channel and initially transmitted an SS block having a beam index of '3', the third indicator may include in indicator that SS burst set began with an SS block having the beam index '3.' The third indicator may be constant for each SS block in measurement window.

Aspects of the disclosure are initially described in the context of a wireless communications system. Aspects of the disclosure are further illustrated by and described with reference to apparatus diagrams, system diagrams, beamforming scheme diagrams, and flowcharts that relate to synchronization signal block signaling for NR in shared spectrum.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a NR network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

Synchronization (e.g., cell acquisition) may be performed using synchronization signals or channels transmitted by a synchronization source (e.g., a base station 105). A base station may transmit synchronization signal blocks containing discovery reference signals (DRS). Synchronization signals may include a PSS or an SSS. A UE 115 attempting to access a wireless network may perform an initial cell search by detecting a PSS from a base station 105. The PSS may enable synchronization of slot timing and may indicate a physical layer identity value. The PSS may be utilized to acquire timing and frequency portions of a cell identification (e.g., physical cell identifier (PCID)). The UE 115 may then receive an SSS. The SSS may enable radio frame synchronization, and may provide a cell identity value, which may be combined with the physical layer identity value to identify the cell. The SSS may also enable detection of a duplexing mode and a cyclic prefix (CP) length. An SSS may be used to acquire the full PCID and other system information (e.g., subframe index). The PBCH may be used to acquire additional system information needed for acquisition (e.g., bandwidth, frame index, etc.). In some examples, a base station 105 may transmit an SSS but not a PSS, or a combined synchronization signal.

After receiving the PSS and SSS, the UE 115 may receive a master information block (MIB), which may be transmitted in a downlink physical channel for broadcast information (e.g., a PBCH). The MIB may contain system bandwidth information, a system frame number (SFN), and a physical hybrid automatic repeat request (HARD) indicator channel (PHICH) configuration. After decoding the MIB, the UE 115 may receive one or more system information blocks (SIBs). Different SIBs may be defined according to the type of system information conveyed. SIB1 includes access information such as cell identity information, and may also indicate whether a UE 115 is allowed to camp on a cell. SIB1 also includes cell selection information (or cell selection parameters). Additionally, SIB1 includes scheduling information for other SIBs. SIB2 includes access information and parameters related to common and shared channels. SIB3 includes cell reselection parameters. SIB4 and SIBS include reselection information about neighboring LTE cells. SIB6 through SIB8 include reselection information about non-LTE neighboring cells. SIBS includes the name of a Home eNB. SIB10 through SIB12 include emergency notification information (e.g., tsunami and earthquake warnings) and SIB13 includes information related to multimedia broadcast multicast services (MBMS) configuration.

A UE 115 attempting to access a wireless network may perform an initial cell search by detecting a PSS from a base station 105. The PSS may enable synchronization of slot timing and may indicate a physical layer identity value. The UE 115 may then receive an SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. After receiving the PSS and SSS, the UE 115 may receive a MIB, which may be transmitted in the PBCH. The MIB may contain system bandwidth information, an SFN, and a PHICH configuration. After decoding the MIB, the UE 115 may receive one or more SIBs. For example, SIB1 may contain cell access parameters and scheduling information for other SIBs. Decoding SIB1 may enable the UE 115 to receive SIB2. SIB2 may contain RRC configuration information related to RACH procedures, paging, PUCCH, PUSCH, power control, SRS, and cell barring.

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a base station 105, or core network 130 supporting radio bearers for user plane data. At the Physical (PHY) layer, transport channels may be mapped to physical channels.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ LBT procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

The wireless communications system 100 may support synchronization signal block signaling for wireless communications in shared spectrum such that a base station 105 may transmit one or more indicators to a UE 115 in SS blocks of an SS burst, each SS burst associated with a beam sweep pattern according to a DRS repetition periodicity. The base station 105 may also transmit one or more indicators embedded in the minimum system information associated with the SS burst. The base station 105 may transmit sets of SS blocks in the SS burst, where each SS block in the set of SS blocks is transmitted according to a beam sweep pattern.

Figure 2:
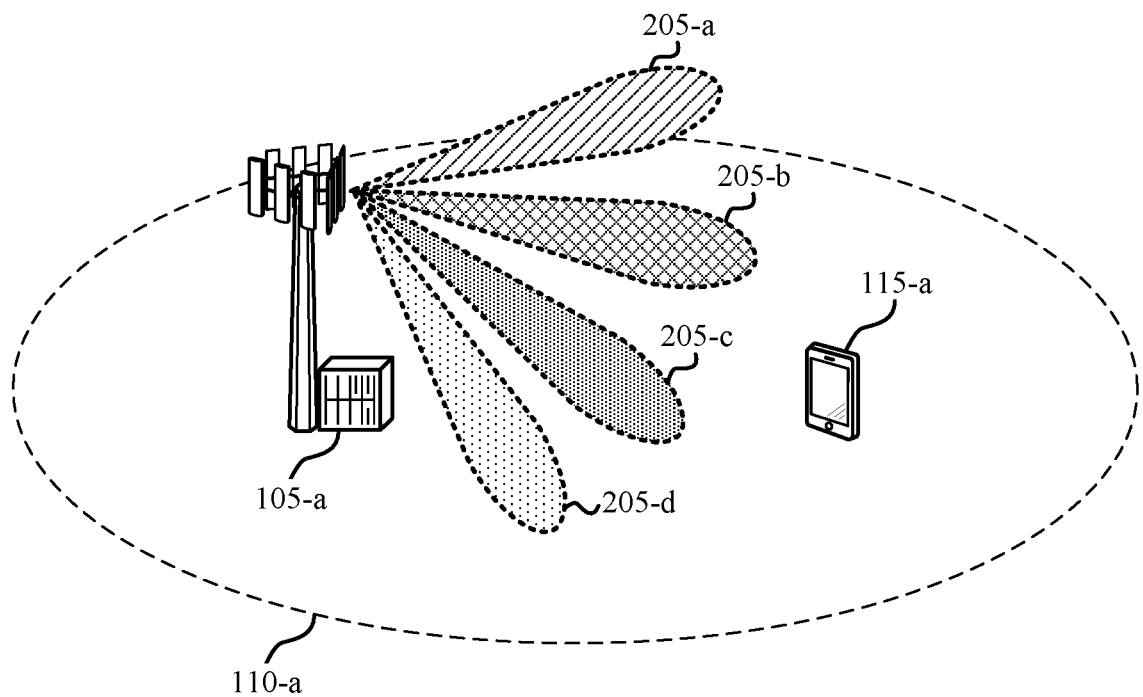
FIG. 2 illustrates an example of a wireless communication system that supports synchronization signal block signaling for wireless communications in shared spectrum in accordance with aspects of the present disclosure.

FIG. 2 illustrates an example of a wireless communications system 200 that supports synchronization signal block signaling for wireless communications in shared spectrum in accordance with various aspects of the present disclosure. Wireless communications system 200 may include a UE 115-a and base station 105-a, which may be examples of a UE 115 and base station 105 as described with reference to FIG. 1. During cell acquisition, base station 105-a may transmit DRSs in SS blocks using different beams 205 (e.g., beam 205-a, 205-b, 205-c, and 205-d, among others) to UE 115-a, and UE 115-a may receive the transmissions using different antenna sub-arrays, or panels. UE 115-a and base station 105-a may determine a suitable beam and panel pair for future communication based on one or more SS blocks transmissions during a cell acquisition procedure.

Base station 105-a may transmit to UE 115-a using multiple beams 205, and UE 115-a may receive the beams 205 using different antenna panels. Of each of the beams 205 and antenna panels, there may be a beam 205 and panel most suitable for wireless communication. For instance, during a cell acquisition procedure, the UE 115-a may receive one or more beams 205 using different panels and may determine the beam and panel pairing that has the strongest signal (i.e., has the highest measured signal strength or highest signal to noise ratio, etc.).

During cell acquisition, base station 105-a may perform a DRS transmission by transmitting one or more SS blocks in an SS burst transmission. The SS burst may include a number of SS blocks, each SS block transmitted over a given beam 205. Base station 105-a may maintain a predetermined number of beams or transmit a predetermined number of beams (e.g., 205-a, 205-b, 205-c, and 205-d) for one SS burst. Base station 105-a may transmit an SS block for each beam. In some examples, the SS block includes information transmitted to UE 115-a, for the purpose of synchronization along each direction. For example, an SS block may include one or more PBCH signals, PSSs, or SSSs, among others. UE 115-a may cycle through panels while receiving the SS bursts to determine the most suitable panel to use for future communication with the base station 105-a. Base station 105-a may be configured to generate a series of SS blocks within a measurement window. In some cases, the base station 105-a may transmit during a first measurement window that includes multiple SS burst sets and a second measurement window that includes multiple SS burst sets. The first measurement window may be a subset of a first measurement period and the second measurement window may be a subset of a second measurement period. Therefore, the measurement window may be described as a period of time within the measurement period, during which an SS burst set will be transmitted.

Base station 105-a may transmit each SS block using a different beam 205. The SS blocks may include DRS such as one or more PBCH messages, a PSS, and an SSS, among others and the DRS signal(s) may be multiplexed according to an FDM or TDM scheme. In some examples, the SS bursts may be contention exempt transmissions and may be transmitted over a designated time period referred to as a contention exempt transmission (CET) period. In the case when the base station 105-a is operating on a shared or unlicensed spectrum, base station 105-a may perform an LBT procedure prior to transmitting one or more SS blocks. The base station 105-a may be configured to perform a channel sensing procedure (e.g., CCA) before accessing the channel. This results in asynchronous behavior across multiple base stations (not shown). In other words, in the case of multiple base stations 105-a, this procedure of CCA forces SS burst sets from each base station 105-a to be asynchronous.

In case of a licensed spectrum, each SS burst set (one SS burst set comprising multiple SS blocks) may be transmitted according to a different beam sweep pattern, and in some cases, the SS burst sets may be repeatedly transmitted according to a measurement period, which may be known to both the base station 105-a and the UE 115-a. Base station 105-a may transmit an SS burst set during the beginning of a measurement window and within a measurement period, and a UE 115-a may receive one or more SS blocks belonging to the SS burst set. In licensed spectrum, due to the known periodicity of SS burst sets, the UE 115-a may be configured to combine one or more SS blocks in order to demodulate information from the SS blocks.

In both licensed and unlicensed spectrum, base station 105-a may include information in SS blocks and transmit the SS blocks. Information may be kept constant through all SS blocks in an SS burst set. An SS block may carry information including a cell id for the SS block, a current beam index, and a measurement window timing. The measurement window timing indicates the start of the measurement window for the SS burst set containing the SS. In addition, in case of the shared or unlicensed spectrum, the base station 105-a may augment the information carried by the SS block by one or more indicators which may be transmitted as part of the individual SS blocks or as separate signals that are associated with individual SS blocks. The indicators may be used by the UE 115-a to determine a start of a measurement period and a remaining amount of time in an SS burst set transmission. During reception of one or more SS bursts, UE 115-a may rotate through panels to determine a suitable panel for communication with base station 105-a.

Figure 3:
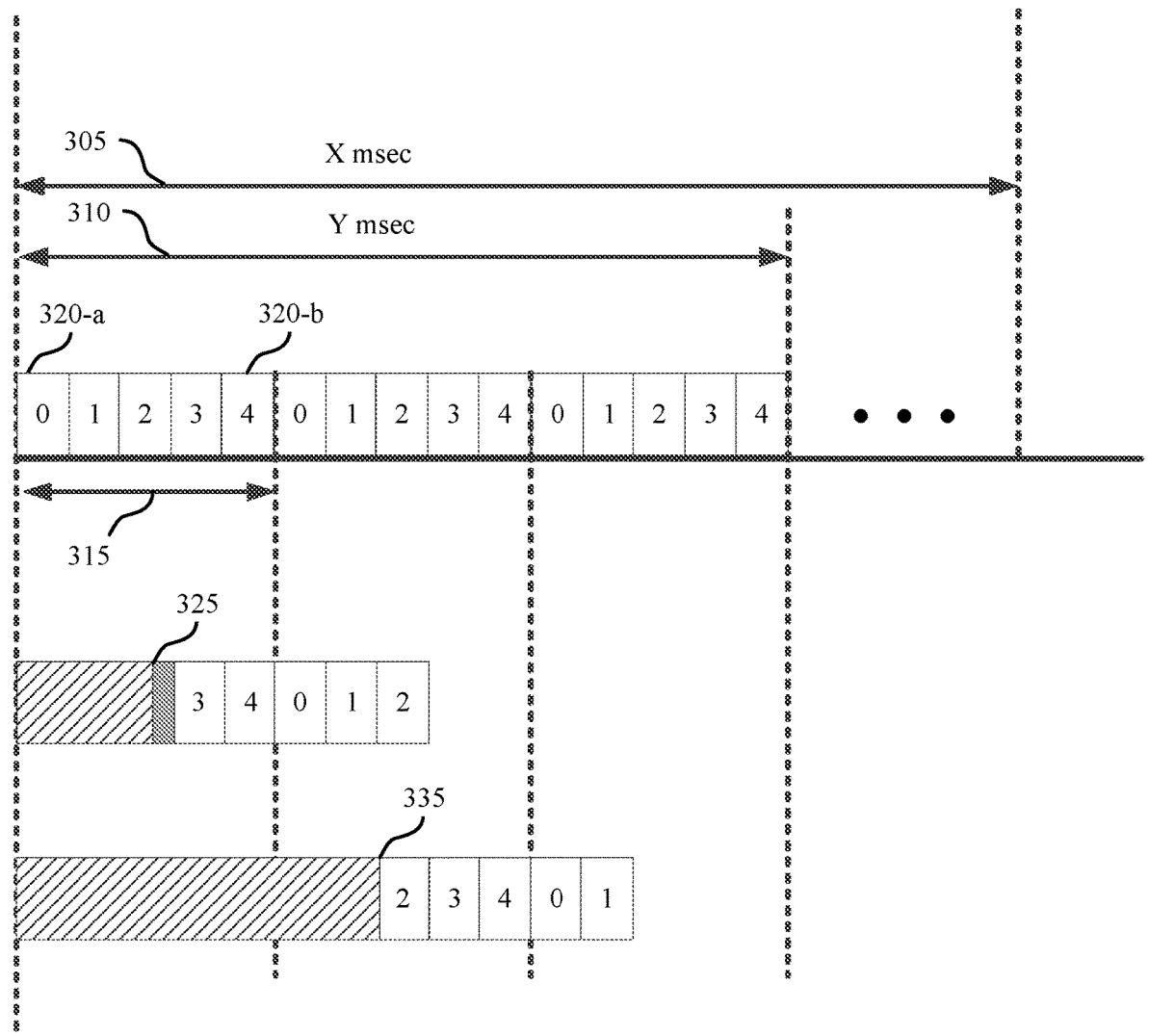
FIG. 3 illustrates an example of SS burst resources that support synchronization signal block signaling for wireless communications in shared spectrum in accordance with aspects of the present disclosure.

FIG. 3 illustrates an example of SS burst resources 300 that support synchronization signal block signaling for wireless communications in shared spectrum in accordance with various aspects of the present disclosure. In some examples, SS burst resources 300 may implement aspects of wireless communications systems 100 or 200 of FIG. 1 or 2. In the example, of FIG. 3, multiple SS bursts 315 may be transmitted by a base station. In this example, SS bursts 315 are transmitted within a measurement window 310. The measurement window 310 may be a subset of a measurement period 305. In this example, a periodicity for the measurement period 305 is configured to be X milliseconds, in which the measurement window 310 may have a duration of Y milliseconds. A tradeoff may exist regarding the duration of the measurement window 310 relative to the duration of the measurement period 305, as a relatively shorter measurement window 310 may provide power savings (e.g., for a UE 115 due to providing a shorter period in which monitor for an SS burst 315) but may also correspond to reduced opportunity for a base station 115 to transmit an SS burst 315.

In examples that use mmW frequencies (in both licensed and unlicensed spectrums), a synchronization transmission may follow a reference timeline (or reference transmissions) for transmitting SS bursts. In this example, the reference timeline is divided into a series of SS blocks or denoted timing in the unit of SS blocks. In the reference transmission, each SS burst set 315 may include five SS blocks 320 starting with a first SS block "0" 320-a transmitted in a first direction, and ending with a fifth SS block "4" 320-b transmitted in a fifth direction. A base station may be configured to align its transmissions according to the reference transmissions. For example, the base station may transmit its SS block along the direction of SS block "0" during the duration of the first SS block "0" 320-a. Each SS block 320 may include PBCH transmissions and PSS/SSS transmissions, such as discussed with reference to FIG. 2.

In examples that use mmW frequencies (in both licensed and unlicensed spectrums), a synchronization transmission may include an SS burst 315, which may include a number of SS blocks 320 that may be transmitted using different transmission beams in a beam sweep pattern. In the example of FIG. 3, multiple base stations may contend for access of the channel to transmit SS blocks. Specially in the case of shared or unlicensed spectrum, base stations may perform a CCA to identify when to transmit SS bursts. A first base station may determine that a channel is busy 340 prior to clearing the channel at time 325. If the time 325 is not aligned with an SS block boundary, then the base station may be configured to transmit a filler signal 330 to align its SS block transmission with a reference timeline for transmitting SS bursts. In some cases, the filler signal may be energy, or a preamble, or a Channel Use Beacon Signal (CUBS), or a combination thereof. In this example, the first station transmits filler signal 330 in order to align the beginning of its first SS block transmission with the beginning of SS block "3" of the reference transmissions. When aligned, the first base station is at an offset with respect to the start of the measurement window 310. The first base station may be configured to align its transmitted beams along with the SS burst 315 in a shifted manner, in order to coincide with the reference transmissions. In this example, the first base station transmits its first SS block along the direction of SS block "3," its second SS block along the direction of SS block "4," its third SS block along the direction of SS block "0," its fourth SS block along the direction of SS block "1," and its fifth SS block along the direction of SS block "2."

In a similar manner, a second base station may determine that a channel is busy 340 prior to clearing the channel at time 335. In the example of the second base station, the time 335 is aligned with an SS block boundary (SS block boundary of SS block "2") of the reference transmission. Since the second base station is at an offset with respect to the start of the measurement window 310, the second base station may be configured to align its transmitted beams along with the SS burst 315 in a shifted manner. In this example, the second base station transmits its first SS block along the direction of SS block "2," its second SS block along the direction of SS block "3," its third SS block along the direction of SS block "4," its fourth SS block along the direction of SS block "0," and its fifth SS block along the direction of SS block "1."

In some examples, the first base station and the second base station may belong to a single operator. In some other examples, the first base station and the second base station may belong to different operators. In such examples, the first base station and the second base station may be neutral cells serving multiple operators. The consumer of the SS block transmissions is an UE. Initially when the UE first attempts to synchronize with a base station on the channel, it has no notion of the measurement period 305 or the measurement window 310. The base stations may transmit this information to the UE by augmenting the SS block signaling.

Figure 4:
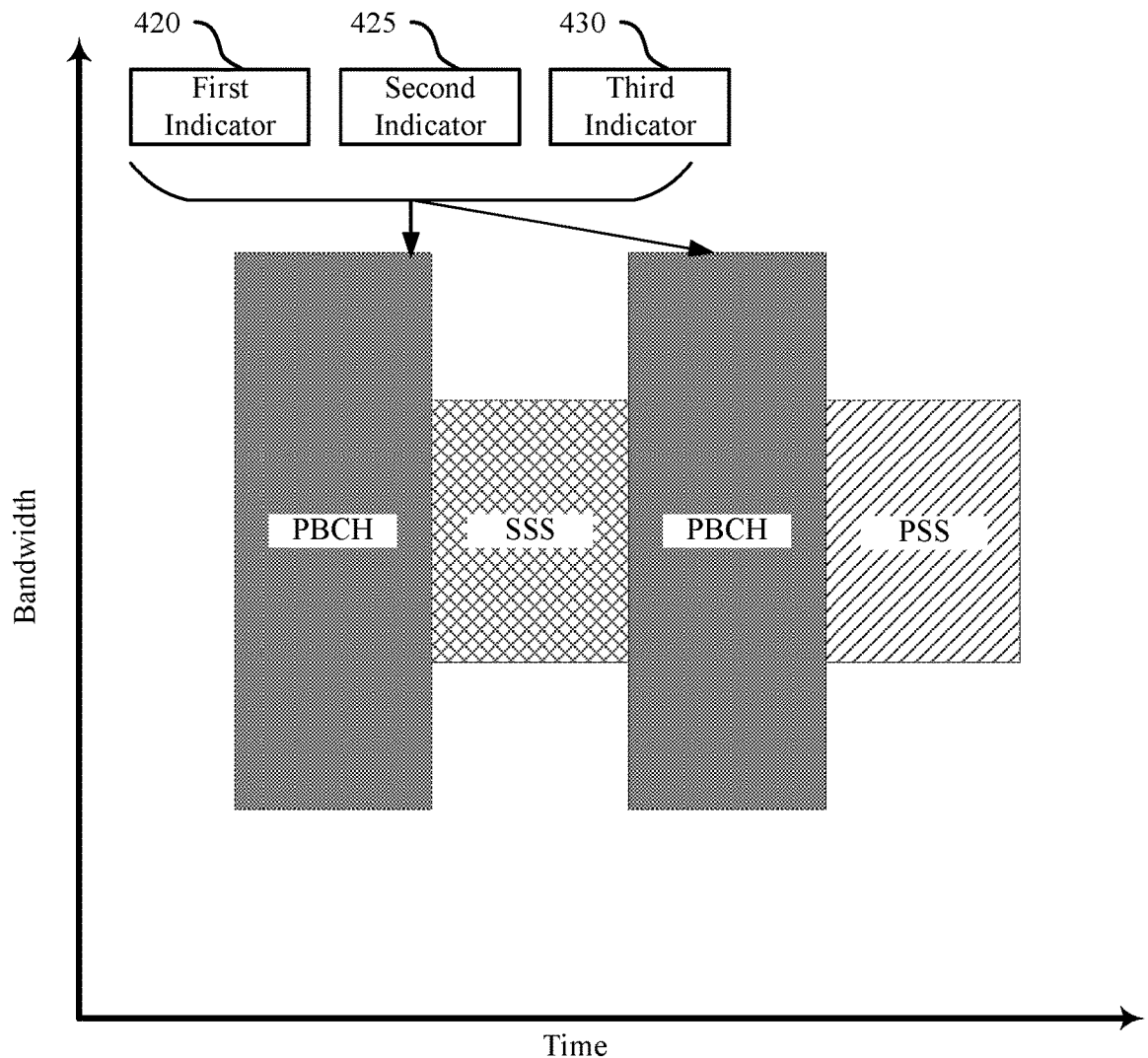
FIG. 4 illustrates an example of SS block resources that support synchronization signal block signaling for wireless communications in shared spectrum in accordance with aspects of the present disclosure.
Figure 4:
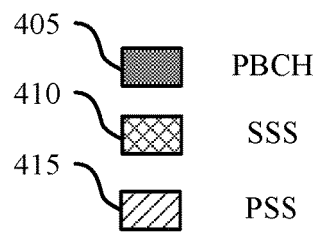

FIG. 4 illustrates an example of SS block resources 400 that support synchronization signal block signaling for wireless communications in shared spectrum in accordance with various aspects of the present disclosure. In some examples, SS block resources 400 may implement aspects of wireless communications systems 100 and 200. In this example, SS block resources 400 may include four symbols, two of which may be used to transmit PBCH transmissions 405, one may be used for SSS transmissions 410, and one may be used for PSS transmissions 415. As discussed above, PBCH transmissions 405 may include one or more of the first indicator 420, the second indicator 425, and the third indicator 430. The first indicator 420, the second indicator 425, and the third indicator 430 may be used by the UE to determine a start of a measurement period and a remaining amount of time in an SS burst set transmission.

In the example of FIG. 4, one or more of the first indicator 420, the second indicator 425, and the third indicator 430 may be embedded within the PBCH transmission 405. In this example, In this example, one or more of the indicators may be embedded into either one or both of the symbols of PBCH transmission 405. In this example, the first indicator 420, the second indicator 425, and the third indicator 430 are transmitted as part of the individual SS block. In other examples, the indicators may be transmitted as separate signals that are associated with individual SS blocks. As discussed above, the first indicator 420 may include a timing of access by the base station to a channel of the shared radio frequency spectrum band with respect to the start of the current measurement window. In some cases, the first indicator 420 may be constant in all SS blocks of a given SS burst set transmission. The second indicators 425 may include a current beam index associated with an individual SS block transmission. The third indicators 430 may indicate a remaining number of SS blocks to be transmitted in the current SS burst set transmission.

In one example, the third indicator 430 may include a starting beam index for the current SS burst set used for the first SS block transmission that was transmitted, after the base station gained access to the channel during the current measurement window, which may be referred to as a sequentially first transmission beam. For example, in the context of the example described above in reference to FIG. 3, the first base station transmits its first SS block along the direction of SS block "3," and the second base station transmits its first SS block along the direction of SS block "2"—thus, the third indicator 430 for the first base station may indicate the beam index corresponding to the direction of SS block "3," and the third indicator 430 for the second base station may indicate the beam index corresponding to the direction of SS block "2." The third indicator 439 may in some examples remain constant for each SS block of the SS burst, as the beam index for the sequentially first transmission beam applies to all transmissions in the current SS burst set.

In some cases, based on the third indicator 430 and the second indicator 425, a UE 115 may determine the remaining number of SS blocks to be transmitted in the current SS burst set transmission. For example, if the second indicator 425 indicates a beam index "0," and the third indicator 420 indicates a beam index "3," and the UE 115 knows that there are five total beam indexes for an SS burst set, the UE 115 may determine that beam indexes "1" and "2" and thus two SS blocks remain to be transmitted in the current SS burst set transmission (e.g., because if the available indices are 0-4, and current beam index is 0, and the current SS burst set begin with index 3, then 3, 4, and 0 have occurred, leaving 0 and 1 remaining).

A UE may use, in some examples, the first indicator 420, the second indicator 425, and the third indicator 430 for demodulation of PBCH transmissions 405, and thus the indicators embedded in the PBCH transmissions 405 may provide sufficient channel estimation for demodulating the PBCH transmissions 405.

Figure 5:
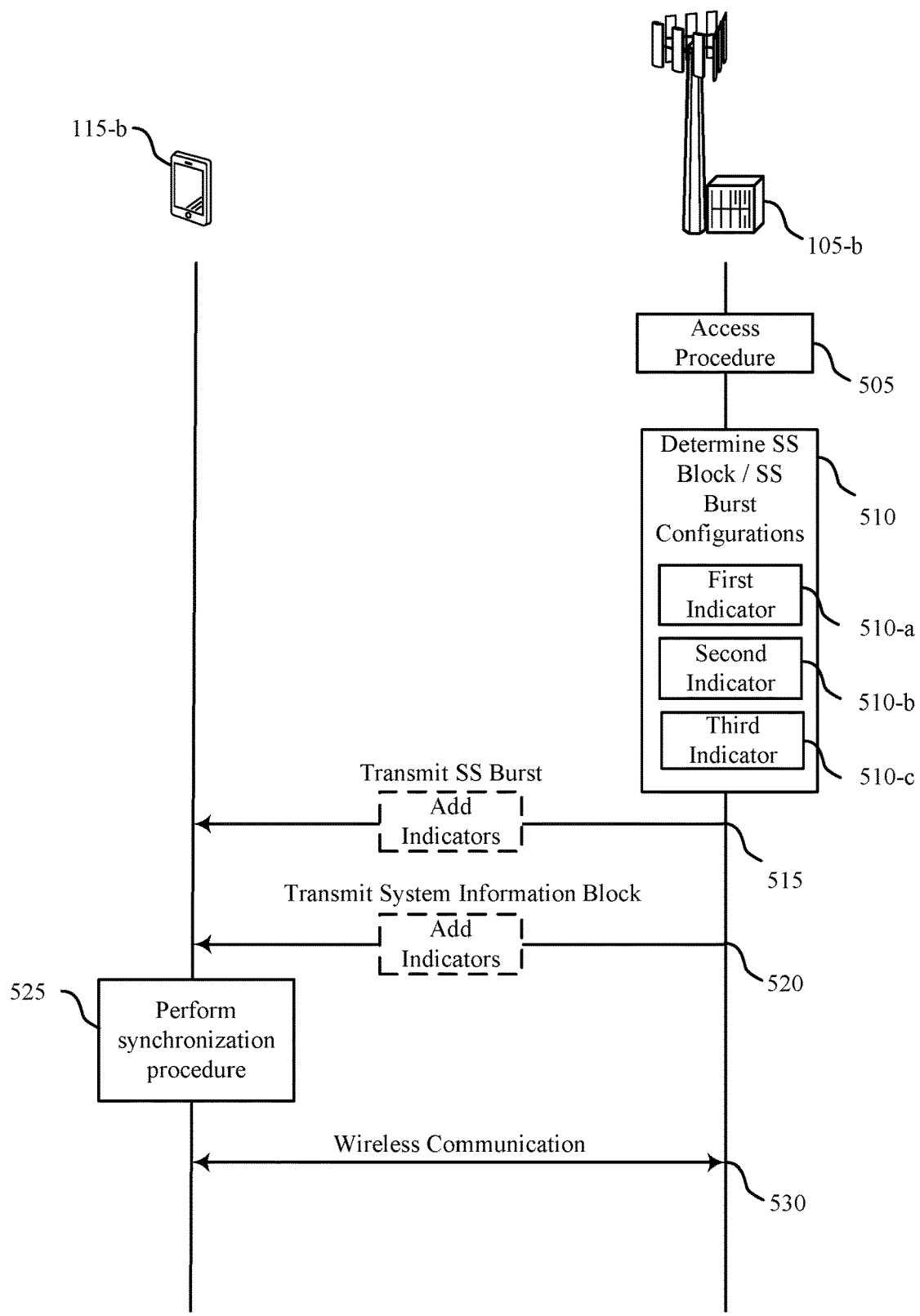
FIG. 5 illustrates an example of a process flow that supports synchronization signal block signaling for wireless communications in shared spectrum in accordance with aspects of the present disclosure.

FIG. 5 illustrates an example of a process flow 500 that supports synchronization signal block signaling for wireless communications in shared spectrum in accordance with various aspects of the present disclosure. Process flow 500 may include base station 105-*b* and UE 115-*b*, which may be respective examples of a base station 105 and UE 115 as described with reference to FIGS. 1-2.

At 505, base station 105-*b* may perform an access procedure to obtain access to a shared radio frequency spectrum band during a measurement window. Base station 105-*b* may perform a CCA to determine a time for accessing the channel.

At 510, base station 105-*b* may determine an SS block configuration and an SS burst configuration. Upon accessing the channel, base station 105-*b* may determine a set of SS blocks to be transmitted in an SS burst. Base station 105-*b* may generate the SS burst comprising a plurality of SS blocks.

For example, at 510-*a*, base station 105-*b* may determine a chronological burst-set number based on a timing of the access procedure and a beginning of the measurement window. In other words, base station 105-*b* may determine a number of SS burst sets transmitted prior to the current SS burst set, as measured from the beginning of the measurement window. Referring back to the example of FIG. 3, the chronological burst set number for the first SS block transmission (SS block "2") of second base station would be 1. Base station 105-*b* may further determine a first indicator comprising of the chronological burst-set number. In some cases, the first indicator is constant for all SS blocks of the SS burst.

At 520-*b*, base station 105-*b* may determine a second indicator to be signaled to UE 115-*b*. In some cases, the second indicator may comprise of a current beam index of the transmission beam. For example, the second indicator may comprise of an indication of a beam used for the SS block transmission.

At 520-*c*, base station 105-*b* may determine a beam index of a sequentially first transmission beam used for a sequentially first SS block transmission after obtaining access to the shared radio frequency spectrum band. The base station 105-*b* may determine the beam index based on a timing of the access procedure and a beginning of the measurement window. In other words, the beam index may be determined as a starting beam index when base station 105-*b* gained access to the channel. In some cases, the third indicator may comprise of the beam index of the sequentially first transmission beam (or starting beam index). In some examples, the third indicator is constant for all SS blocks of the SS burst. In some examples, each SS block of the SS burst comprises a PBCH, and at least one of the first indicator, the second indicator, the third indicator, may be embedded in the PBCH.

At 515, base station 105-*b* may transmit the SS burst to UE 115-*b*. Base station 105-*b* may perform a beam sweeping first transmission of the SS burst over the shared radio frequency spectrum based on the access procedure. In some examples, the transmission may include at least one of the first indicator of the time of access to the shared radio frequency spectrum band with respect to the measurement window, the second indicator of the transmission beam associated with the SS block, and the third indicator of a quantity of remaining SS blocks from the plurality of SS blocks to follow the SS block in the measurement window. In some examples, one or more of the first indicator, the second indicator and the third indicator may be added to the SS burst prior to transmitting the SS burst to UE 115-*b*. In some examples, base station 105-*b* may transmit all SS blocks of the SS burst during the measurement window. In some examples, base station 105-*b* may transmit all SS blocks of a SS burst-set during the measurement window.

At 520, base station 105-*b* may transmit an SIB to UE 115-*b*. The SIB may include minimum system information associated with the SS burst. In some examples, one or more of the first indicator, the second indicator and the third indicator may be added to the minimum system information prior to transmitting the SIB to UE 115-*b*. In some other examples, one or more of the first indicator, the second indicator and the third indicator may be added the minimum system information and the remaining indicators may be added to the SS burst. In some examples, the minimum system information may be part of the SIBs transmitted by the base station 105-*b*. In some cases, the SIBs may be transmitted within every measurement period. In one example, the minimum system information may be time-aligned with the SS block transmission. In another example, In one examples, the minimum system information may not be time-aligned with the SS-block transmission.

At 525, UE 115-*b* may receive from a base station a beam sweeping first transmission over the shared radio frequency spectrum band. For example, UE 115-*b* may receive the first transmission including at least one SS block of the SS burst. In some cases, UE 115-*b* may receive one or more SS blocks from a second neighboring base station 105-*b*. The received transmission (SS block/minimum system information) may further include the first indicator of the time of access to the shared radio frequency spectrum band with respect to the measurement window, the second indicator of the transmission beam associated with the SS block, and the third indicator of the quantity of remaining SS blocks from the plurality of SS blocks to follow the SS block in the measurement window. UE 115-*b* may receive one or more transmissions and may determine the beam from base station 105-*b* that has the strongest signal (i.e., has the highest measured signal strength or highest signal to noise ratio, etc.). Upon determining the strongest signal, UE 115-*b* may perform a synchronization procedure with base station 105-*b* based on the received SS block.

At 530, UE 115-*b* and base station 105-*b* may communicate over the shared radio frequency spectrum band.

Figure 6:
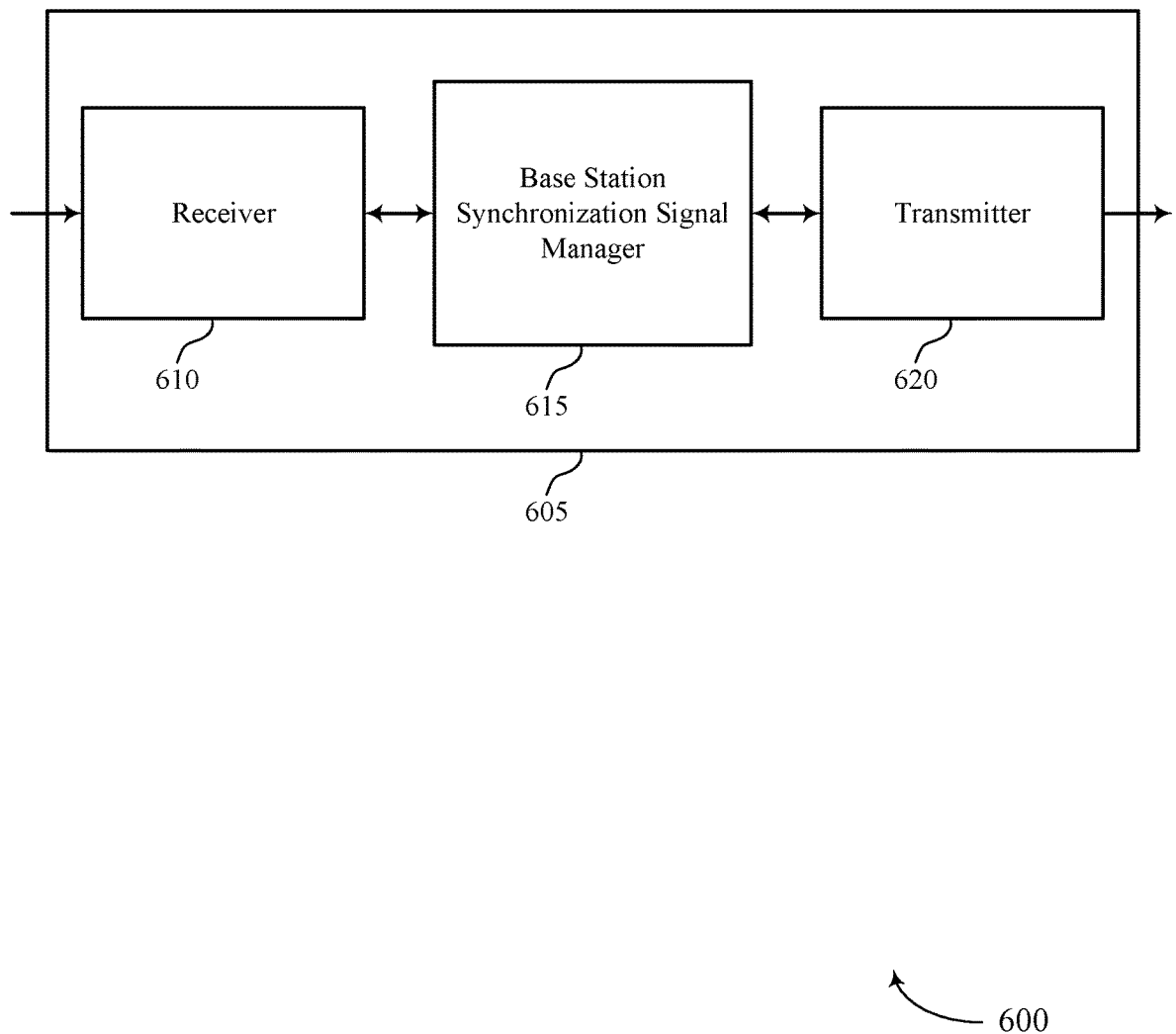
FIGS. 6 through 8 show block diagrams of a device that supports synchronization signal block signaling for wireless communications in shared spectrum in accordance with aspects of the present disclosure.

FIG. 6 shows a block diagram 600 of a wireless device 605 that supports synchronization signal block signaling for wireless communications in shared spectrum in accordance with aspects of the present disclosure. Wireless device 605 may be an example of aspects of a base station 105 as described herein. Wireless device 605 may include receiver 610, base station synchronization signal manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to synchronization signal block signaling for wireless communications in shared spectrum, etc.). Information may be passed on to other components of the device. The receiver 610 may be an example of aspects of the transceiver 935 described with reference to FIG. 9. The receiver 610 may utilize a single antenna or a set of antennas.

Base station synchronization signal manager 615 may be an example of aspects of a base station synchronization signal manager 715, a base station synchronization signal manager 815, or a base station synchronization signal manager 915 described with reference to FIGS. 7, 8, and 9.

Base station synchronization signal manager 615 and/or at least some of its various sub-components may be implemented in hardware, software executed by a processor, firmware, or any combination thereof. If implemented in software executed by a processor, the functions of the base station synchronization signal manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station synchronization signal manager 615 and/or at least some of its various sub-components may be physically located at various positions, including being distributed such that portions of functions are implemented at different physical locations by one or more physical devices. In some examples, base station synchronization signal manager 615 and/or at least some of its various sub-components may be a separate and distinct component in accordance with various aspects of the present disclosure. In other examples, base station synchronization signal manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station synchronization signal manager 615 may perform, an access procedure to obtain access to a shared radio frequency spectrum band during a measurement window, generate a SS burst including a set of SS blocks and perform a beam sweeping first transmission of the SS burst over the shared radio frequency spectrum may be based on the access procedure. In some cases, each SS block of the SS burst is transmitted during the first transmission using a different transmission beam. In some cases, one of the first transmission, a second transmission by the base station, or a combination thereof includes: a first indication of a time of access to the shared radio frequency spectrum band with respect to the measurement window, a second indication of a transmission beam associated with the SS block, and a third indication of a quantity of remaining SS blocks from the set of SS blocks to follow the SS block in the measurement window.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
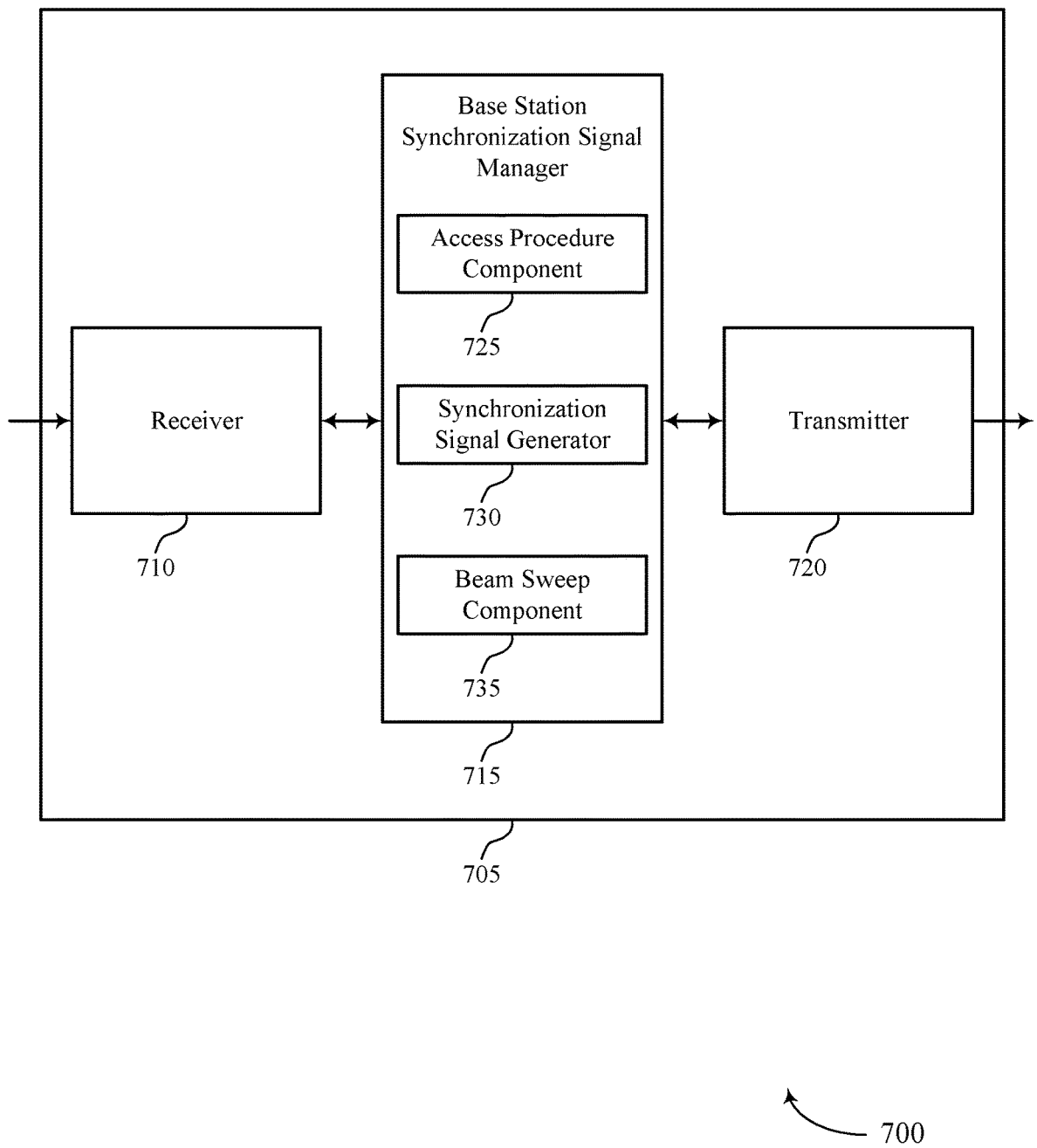

FIG. 7 shows a block diagram 700 of a wireless device 705 that supports synchronization signal block signaling for wireless communications in shared spectrum in accordance with aspects of the present disclosure. Wireless device 705 may be an example of aspects of a wireless device 605 or a base station 105 as described with reference to FIG. 6. Wireless device 705 may include receiver 710, base station synchronization signal manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to synchronization signal block signaling for wireless communications in shared spectrum, etc.). Information may be passed on to other components of the device. The receiver 710 may be an example of aspects of the transceiver 935 described with reference to FIG. 9. The receiver 710 may utilize a single antenna or a set of antennas.

Base station synchronization signal manager 715 may be an example of aspects of a base station synchronization signal manager 615, a base station synchronization signal manager 815, or a base station synchronization signal manager 915 described with reference to FIGS. 6, 8, and 9.

Base station synchronization signal manager 715 may also include access procedure component 725, synchronization signal generator 730, and beam sweep component 735. Access procedure component 725 may perform, an access procedure to obtain access to a shared radio frequency spectrum band during a measurement window.

Synchronization signal generator 730 may generate an SS burst including a set of SS blocks. In some cases, each SS block of the SS burst includes a PBCH including one of the first indication, the second indication, the third indication, or a combination thereof.

Beam sweep component 735 may transmit the SS burst over the shared radio frequency spectrum band. In some cases, beam sweep component 735 may transmit all SS blocks of the SS burst during the measurement window and may transmit all SS blocks of a SS burst-set during the measurement window. In some cases, beam sweep component 735 perform a beam sweeping first transmission of the SS burst over the shared radio frequency spectrum based on the access procedure. In some cases, each SS block of the SS burst may be transmitted during the first transmission using a different transmission beam. In some examples, one of the first transmission, a second transmission by the base station, or a combination thereof includes: a first indication of a time of access to the shared radio frequency spectrum band with respect to the measurement window, a second indication of a transmission beam associated with the SS block, and a third indication of a quantity of remaining SS blocks from the set of SS blocks to follow the SS block in the measurement window. In some cases, the first indication is constant for all SS blocks of the SS burst. In some cases, the second indication includes a beam index of the transmission beam. In some cases, the third indication includes the beam index of the sequentially first transmission beam. In some cases, the third indication is constant for all SS blocks of the SS burst. In some cases, the second transmission includes a minimum system information associated with the SS burst.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
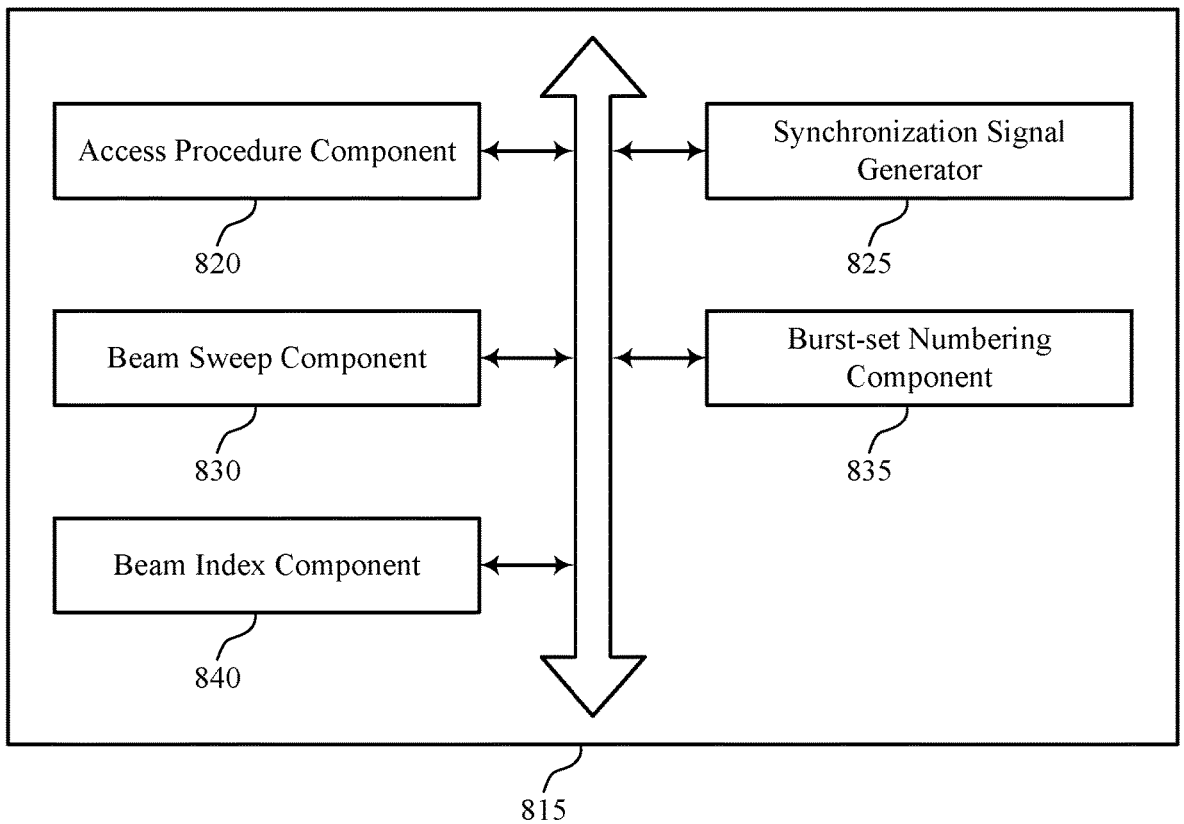

FIG. 8 shows a block diagram 800 of a base station synchronization signal manager 815 that supports synchronization signal block signaling for wireless communications in shared spectrum in accordance with aspects of the present disclosure. The base station synchronization signal manager 815 may be an example of aspects of a base station synchronization signal manager 615, a base station synchronization signal manager 715, or a base station synchronization signal manager 915 described with reference to FIGS. 6, 7, and 9. The base station synchronization signal manager 815 may include access procedure component 820, synchronization signal generator 825, beam sweep component 830, burst-set numbering component 835, and beam index component 840. Each of these modules may communicate, directly or indirectly, with one another (e.g., via one or more buses).

Access procedure component 820 may perform an access procedure to obtain access to a shared radio frequency spectrum band during a measurement window. Synchronization signal generator 825 may generate an SS burst including a set of SS blocks. In some cases, each SS block of the SS burst includes a physical broadcast channel PBCH including one of the first indication, the second indication, the third indication, or a combination thereof.

Beam sweep component 830 may transmit the SS burst over the shared radio frequency spectrum band that includes transmitting all SS blocks of the SS burst during the measurement window and transmitting all SS blocks of a SS burst-set during the measurement window. In some cases, beam sweep component 830 may perform a beam sweeping first transmission of the SS burst over the shared radio frequency spectrum based on the access procedure. In some cases, each SS block of the SS burst is transmitted during the first transmission using a different transmission beam; where one of the first transmission, a second transmission by the base station, or a combination thereof includes: a first indication of a time of access to the shared radio frequency spectrum band with respect to the measurement window, a second indication of a transmission beam associated with the SS block, and a third indication of a quantity of remaining SS blocks from the set of SS blocks to follow the SS block in the measurement window. In some cases, the first indication is constant for all SS blocks of the SS burst. In some cases, the second indication includes a beam index of the transmission beam. In some cases, the third indication includes the beam index of the sequentially first transmission beam. In some cases, the third indication is constant for all SS blocks of the SS burst. In some cases, the second transmission includes a minimum system information associated with the SS burst.

Burst-set numbering component 835 may determine a chronological burst-set number based on a timing of the access procedure and a beginning of the measurement window; where the first indication includes the chronological burst-set number.

Beam index component 840 may determine a beam index of a sequentially first transmission beam used for a sequentially first SS block transmission after obtaining access to the shared radio frequency spectrum band, the beam index determined based on a timing of the access procedure and a beginning of the measurement window.

Figure 9:
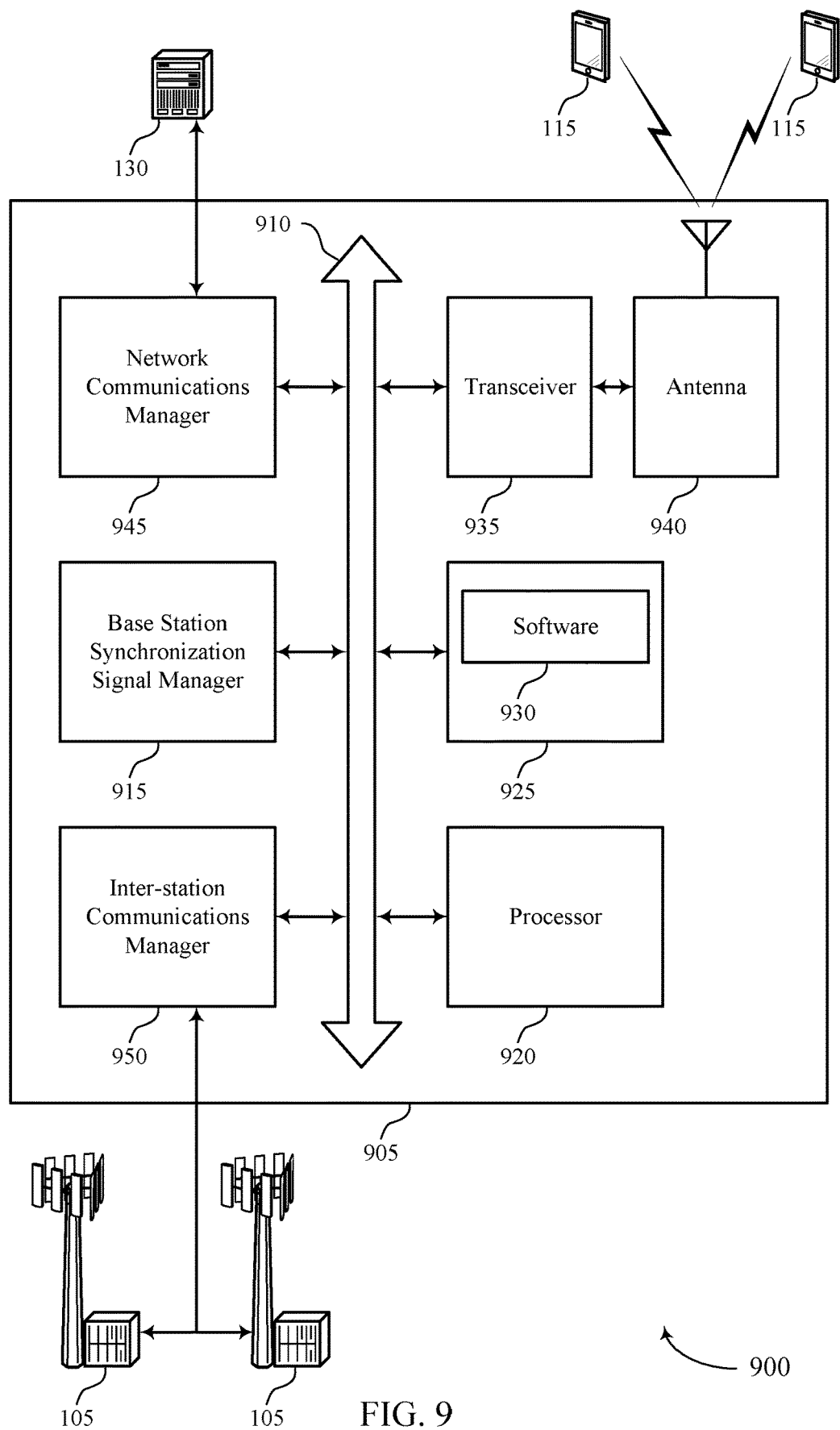
FIG. 9 illustrates a block diagram of a system including a base station that supports synchronization signal block signaling for wireless communications in shared spectrum in accordance with aspects of the present disclosure.

FIG. 9 shows a diagram of a system 900 including a device 905 that supports synchronization signal block signaling for wireless communications in shared spectrum in accordance with aspects of the present disclosure. Device 905 may be an example of or include the components of wireless device 605, wireless device 705, or a base station 105 as described above, e.g., with reference to FIGS. 6 and 7. Device 905 may include components for bi-directional voice and data communications including components for transmitting and receiving communications, including base station synchronization signal manager 915, processor 920, memory 925, software 930, transceiver 935, antenna 940, network communications manager 945, and inter-station communications manager 950. These components may be in electronic communication via one or more buses (e.g., bus 910). Device 905 may communicate wirelessly with one or more UEs 115.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting synchronization signal block signaling for wireless communications in shared spectrum).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support synchronization signal block signaling for wireless communications in shared spectrum. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

Network communications manager 945 may manage communications with the core network (e.g., via one or more wired backhaul links). For example, the network communications manager 945 may manage the transfer of data communications for client devices, such as one or more UEs 115.

Inter-station communications manager 950 may manage communications with other base station 105, and may include a controller or scheduler for controlling communications with UEs 115 in cooperation with other base stations 105. For example, the inter-station communications manager 950 may coordinate scheduling for transmissions to UEs 115 for various interference mitigation techniques such as beamforming or joint transmission. In some examples, inter-station communications manager 950 may provide an X2 interface within an LTE/LTE-A wireless communication network technology to provide communication between base stations 105.

Figure 10:
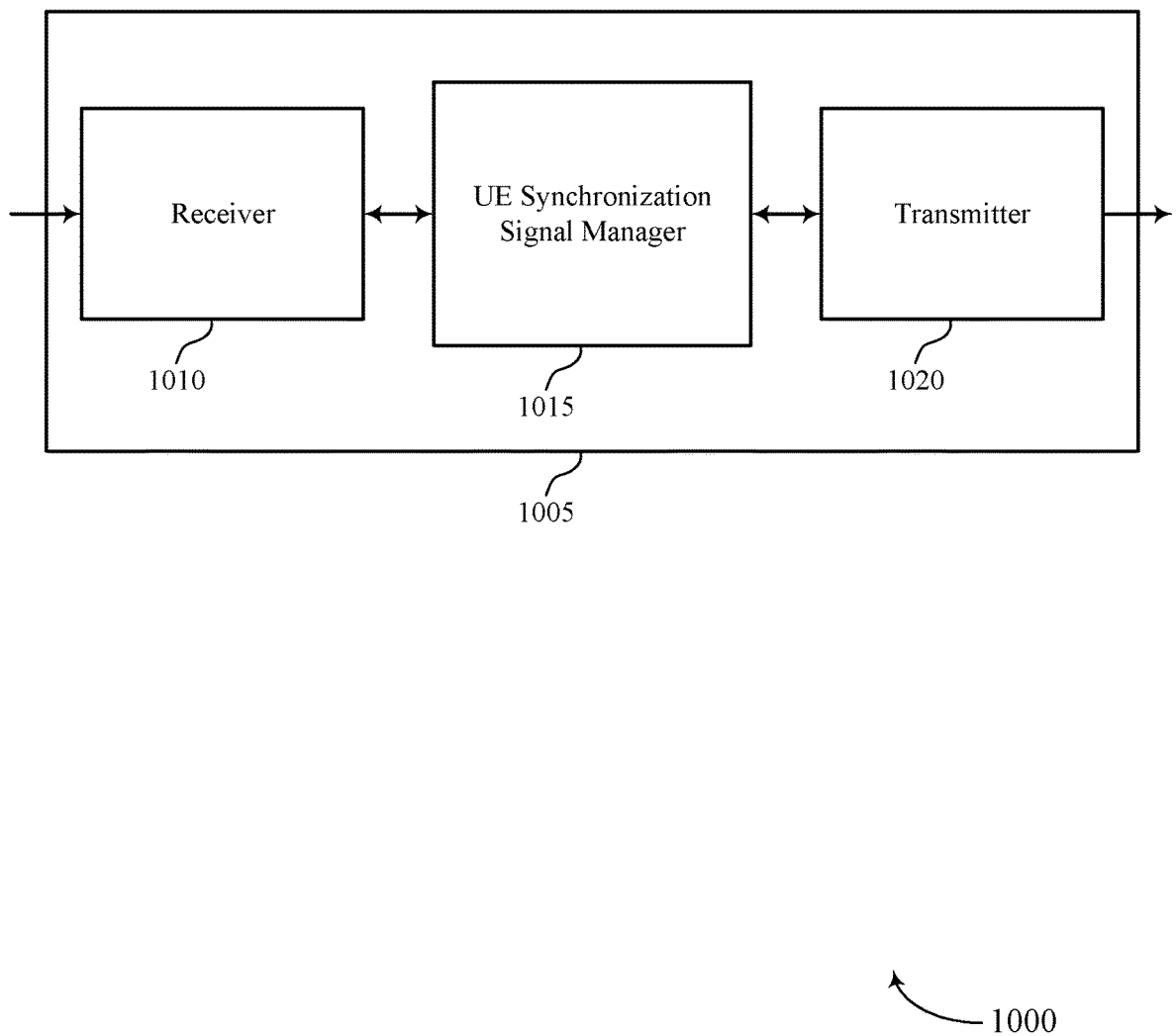
FIGS. 10 through 12 show block diagrams of a device that supports synchronization signal block signaling for wireless communications in shared spectrum in accordance with aspects of the present disclosure.

FIG. 10 shows a block diagram 1000 of a wireless device 1005 that supports synchronization signal block signaling for wireless communications in shared spectrum in accordance with aspects of the present disclosure. Wireless device 1005 may be an example of aspects of a UE 115 as described herein. Wireless device 1005 may include receiver 1010, UE synchronization signal manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to synchronization signal block signaling for wireless communications in shared spectrum, etc.). Information may be passed on to other components of the device. The receiver 1010 may be an example of aspects of the transceiver 1335 described with reference to FIG. 13. The receiver 1010 may utilize a single antenna or a set of antennas.

UE synchronization signal manager 1015 may be an example of aspects of a UE synchronization signal manager 1115, a UE synchronization signal manager 1215, or a UE synchronization signal manager 1315 described with reference to FIGS. 11, 12, and 13.

UE synchronization signal manager 1015 and/or at least some of its various sub-components may be implemented in hardware, software executed by a processor, firmware, or any combination thereof. If implemented in software executed by a processor, the functions of the UE synchronization signal manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE synchronization signal manager 1015 and/or at least some of its various sub-components may be physically located at various positions, including being distributed such that portions of functions are implemented at different physical locations by one or more physical devices. In some examples, UE synchronization signal manager 1015 and/or at least some of its various sub-components may be a separate and distinct component in accordance with various aspects of the present disclosure. In other examples, UE synchronization signal manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE synchronization signal manager 1015 may monitor a shared radio frequency spectrum band during a measurement window for an SS burst and perform a synchronization procedure with a base station based on the received first SS block. In some cases, UE synchronization signal manager 1015 may receive from a base station, a beam sweeping first transmission over the shared radio frequency spectrum band, the first transmission including an SS block of the SS burst; where one of the first transmission, a second transmission received from the base station, or a combination thereof includes: a first indication of a time of access to the shared radio frequency spectrum band with respect to the measurement window, a second indication of a transmission beam associated with the SS block, and a third indication of a quantity of remaining SS blocks from the set of SS blocks to follow the SS block in the measurement window.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
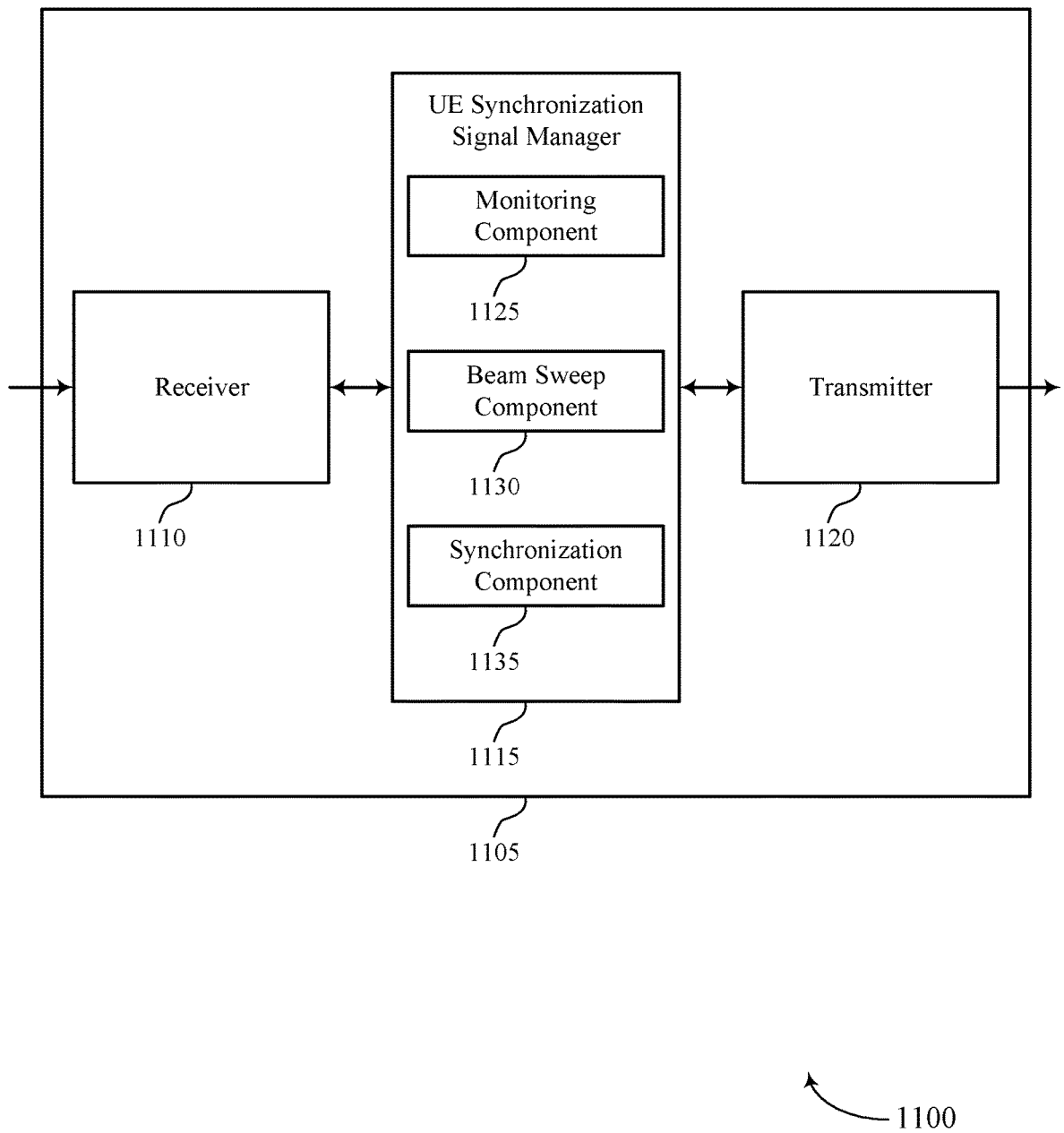

FIG. 11 shows a block diagram 1100 of a wireless device 1105 that supports synchronization signal block signaling for wireless communications in shared spectrum in accordance with aspects of the present disclosure. Wireless device 1105 may be an example of aspects of a wireless device 1005 or a UE 115 as described with reference to FIG. 10. Wireless device 1105 may include receiver 1110, UE synchronization signal manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to synchronization signal block signaling for wireless communications in shared spectrum, etc.). Information may be passed on to other components of the device. The receiver 1110 may be an example of aspects of the transceiver 1335 described with reference to FIG. 13. The receiver 1110 may utilize a single antenna or a set of antennas.

UE synchronization signal manager 1115 may be an example of aspects of a UE synchronization signal manager 1015, a UE synchronization signal manager 1215, or a UE synchronization signal manager 1315 described with reference to FIGS. 10, 12, and 13

UE synchronization signal manager 1115 may also include monitoring component 1125, beam sweep component 1130, and synchronization component 1135. Monitoring component 1125 may monitor a shared radio frequency spectrum band during a measurement window for an SS burst.

Beam sweep component 1130 may receive from a base station a beam sweeping first transmission over the shared radio frequency spectrum band, the first transmission including an SS block of the SS burst; where one of the first transmission, a second transmission received from the base station, or a combination thereof includes: a first indication of a time of access to the shared radio frequency spectrum band with respect to the measurement window, a second indication of a transmission beam associated with the SS block, and a third indication of a quantity of remaining SS blocks from the set of SS blocks to follow the SS block in the measurement window. In some cases, beam sweep component 1130 may receive some SS blocks of the SS burst during the measurement window and determine the quantity of remaining SS blocks from the set of SS blocks to follow the SS block in the measurement window, based on the second indication and the beam index of the sequentially first transmission beam. In some cases, the first indication is constant for all SS blocks of the SS burst. In some cases, the third indication includes a beam index of a sequentially first transmission beam used for a sequentially first SS block transmission in the burst. In some cases, the third indication is constant for all SS blocks of the SS burst. In some cases, each SS block of the SS burst includes a physical broadcast channel including one of the first indication, the second indication, the third indication, or a combination thereof. In some cases, the second transmission includes a minimum system information associated with the SS burst.

Synchronization component 1135 may perform a synchronization procedure with a base station based on the received first SS block. Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
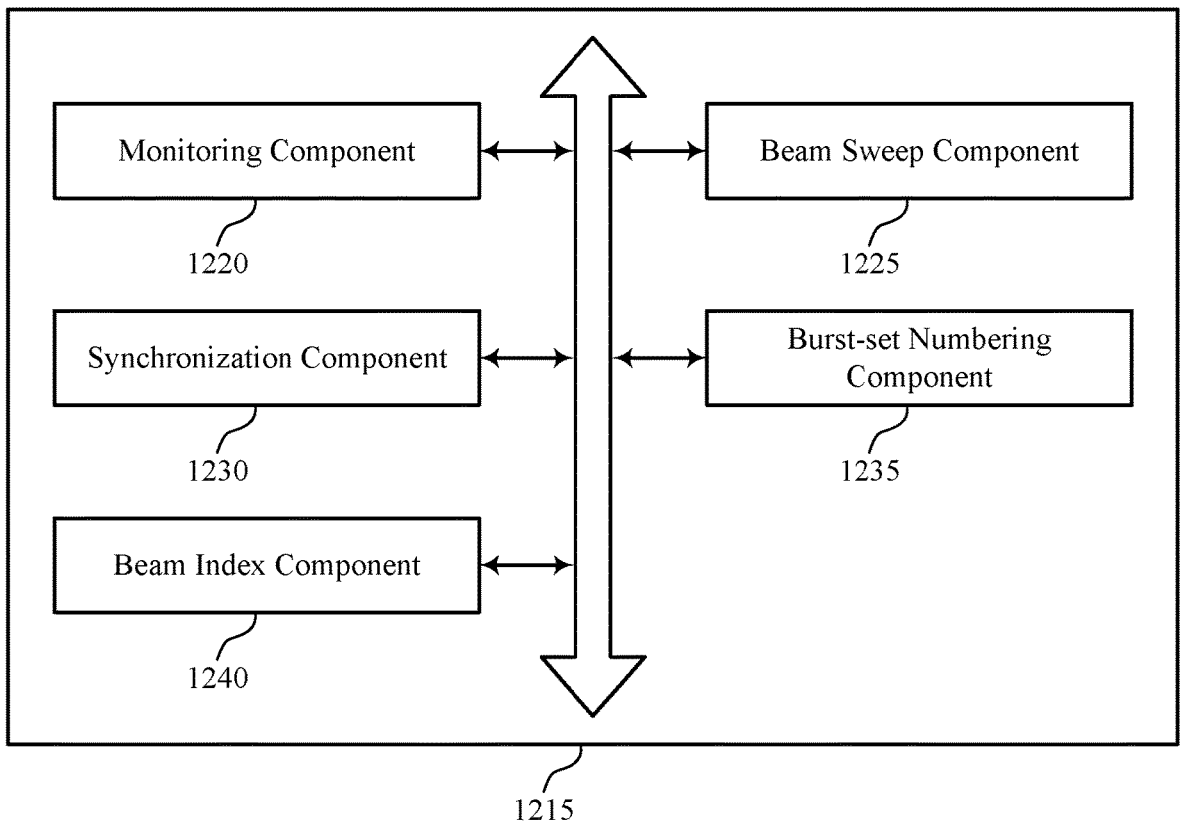

FIG. 12 shows a block diagram 1200 of a UE synchronization signal manager 1215 that supports synchronization signal block signaling for wireless communications in shared spectrum in accordance with aspects of the present disclosure. The UE synchronization signal manager 1215 may be an example of aspects of a UE synchronization signal manager 1015, a UE synchronization signal manager 1115, or a UE synchronization signal manager 1315 described with reference to FIGS. 10, 11, and 13. The UE synchronization signal manager 1215 may include monitoring component 1220, beam sweep component 1225, synchronization component 1230, burst-set numbering component 1235, and beam index component 1240. Each of these modules may communicate, directly or indirectly, with one another (e.g., via one or more buses).

Monitoring component 1220 may monitor a shared radio frequency spectrum band during a measurement window for a synchronization signal (SS) burst. Beam sweep component 1225 may receive the SS burst over the shared radio frequency spectrum band that includes receiving some SS blocks of the SS burst during the measurement window. In some cases, beam sweep component 1225 may determine the quantity of remaining SS blocks from the set of SS blocks to follow the SS block in the measurement window, based on the second indication and the beam index of the sequentially first transmission beam.

In some cases, beam sweep component 1225 may receive from a base station, a beam sweeping first transmission over the shared radio frequency spectrum band, the first transmission including an SS block of the SS burst; where one of the first transmission, a second transmission received from the base station, or a combination thereof includes: a first indication of a time of access to the shared radio frequency spectrum band with respect to the measurement window, a second indication of a transmission beam associated with the SS block, and a third indication of a quantity of remaining SS blocks from the set of SS blocks to follow the SS block in the measurement window. In some cases, the first indication is constant for all SS blocks of the SS burst. In some cases, the third indication includes a beam index of a sequentially first transmission beam used for a sequentially first SS block transmission in the burst. In some cases, the third indication is constant for all SS blocks of the SS burst. In some cases, each SS block of the SS burst includes a physical broadcast channel including one of the first indication, the second indication, the third indication, or a combination thereof. In some cases, the second transmission includes a minimum system information associated with the SS burst.

Synchronization component 1230 may perform a synchronization procedure with a base station based on the received first SS block. Burst-set numbering component 1235 may determine a chronological burst-set number from the received transmission. In some cases, the first indication includes a chronological burst-set number based on a timing of the access procedure and a beginning of the measurement window. Beam index component 1240 may determine a beam index of the transmission beam. In some cases, the second indication includes a beam index of the transmission beam.

Figure 13:
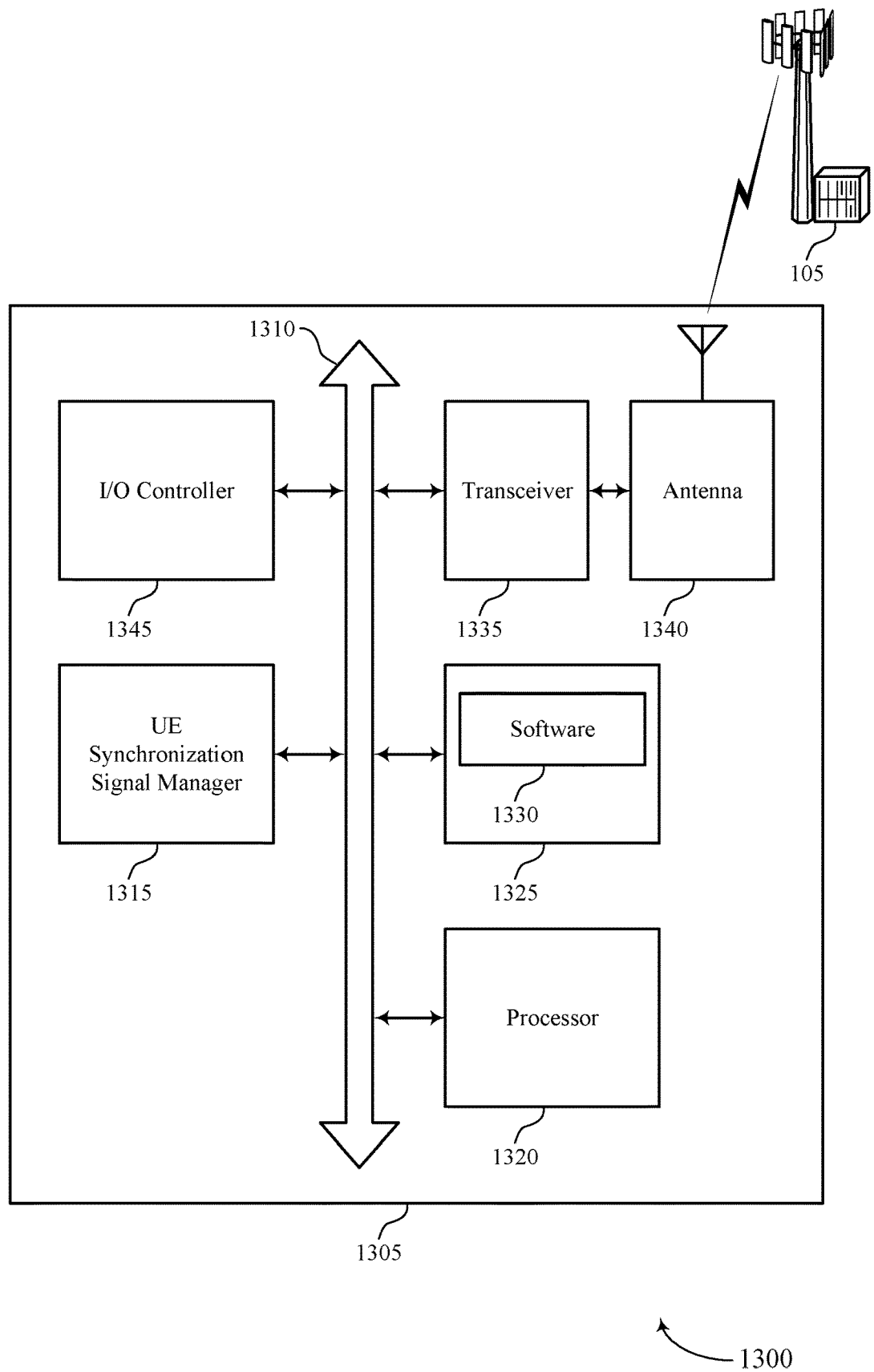
FIG. 13 illustrates a block diagram of a system including a UE that supports synchronization signal block signaling for wireless communications in shared spectrum in accordance with aspects of the present disclosure.

FIG. 13 shows a diagram of a system 1300 including a device 1305 that supports synchronization signal block signaling for wireless communications in shared spectrum in accordance with aspects of the present disclosure. Device 1305 may be an example of or include the components of UE 115 as described above, e.g., with reference to FIG. 1. Device 1305 may include components for bi-directional voice and data communications including components for transmitting and receiving communications, including UE synchronization signal manager 1315, processor 1320, memory 1325, software 1330, transceiver 1335, antenna 1340, and I/O controller 1345. These components may be in electronic communication via one or more buses (e.g., bus 1310). Device 1305 may communicate wirelessly with one or more base stations 105.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting synchronization signal block signaling for wireless communications in shared spectrum).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support synchronization signal block signaling for wireless communications in shared spectrum. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

I/O controller 1345 may manage input and output signals for device 1305. I/O controller 1345 may also manage peripherals not integrated into device 1305. In some cases, I/O controller 1345 may represent a physical connection or port to an external peripheral. In some cases, I/O controller 1345 may utilize an operating system such as iOS®, ANDROID®, MS-DOS®, MS-WINDOWS®, OS/2®, UNIX®, LINUX®, or another known operating system. In other cases, I/O controller 1345 may represent or interact with a modem, a keyboard, a mouse, a touchscreen, or a similar device. In some cases, I/O controller 1345 may be implemented as part of a processor. In some cases, a user may interact with device 1305 via I/O controller 1345 or via hardware components controlled by I/O controller 1345.

Figure 14:
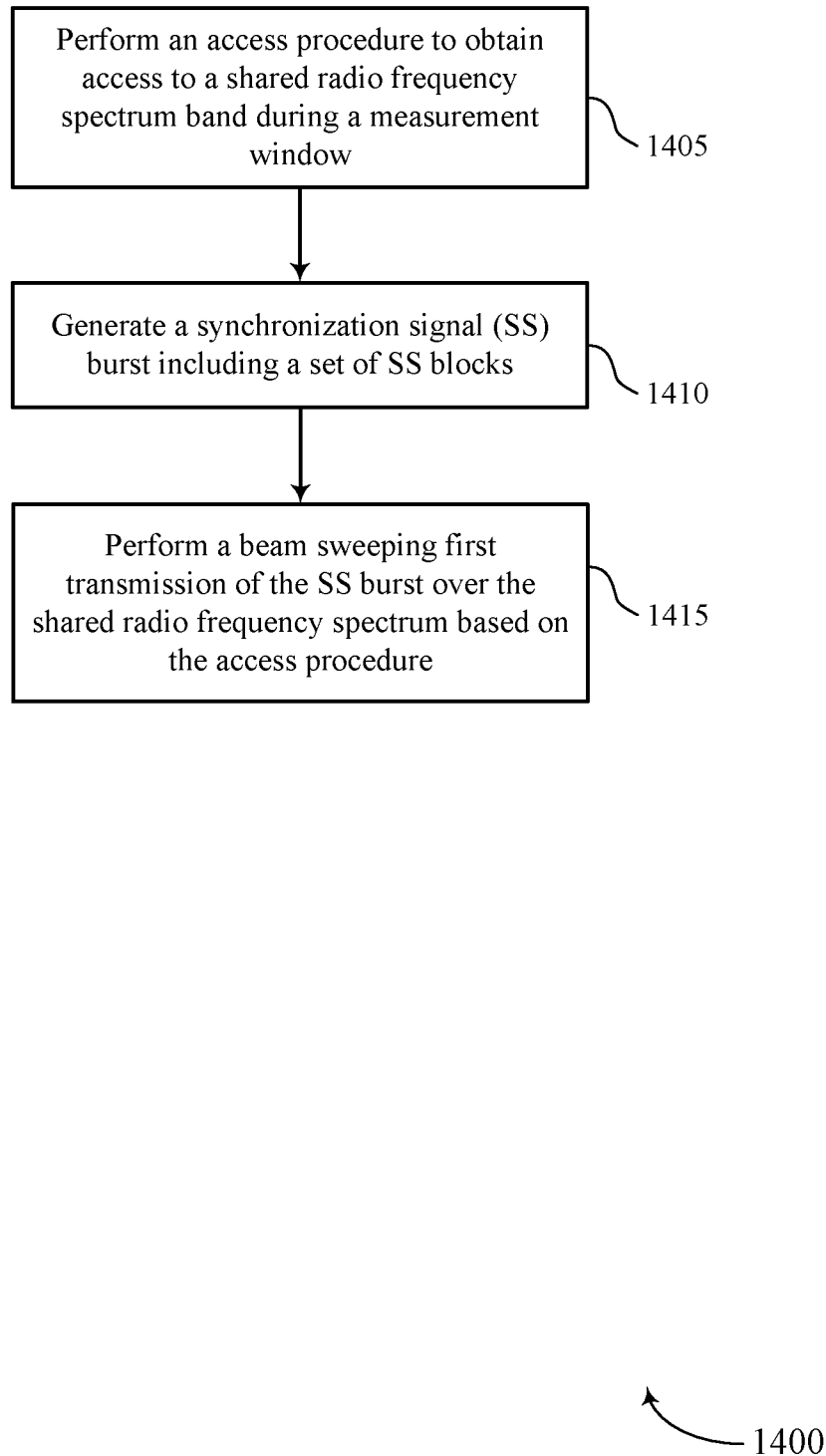
FIGS. 14 through 16 illustrate methods for synchronization signal block signaling for wireless communications in shared spectrum in accordance with aspects of the present disclosure.

FIG. 14 shows a flowchart illustrating a method 1400 for synchronization signal block signaling for wireless communications in shared spectrum in accordance with aspects of the present disclosure. The operations of method 1400 may be implemented by a base station 105 or its components as described herein. For example, the operations of method 1400 may be performed by a base station synchronization signal manager as described with reference to FIGS. 6 through 9. In some examples, a base station 105 may execute a set of codes to control the functional elements of the device to perform the functions described below. Additionally or alternatively, the base station 105 may perform aspects of the functions described below using special-purpose hardware.

At block 1405 the base station 105 may perform an access procedure to obtain access to a shared radio frequency spectrum band during a measurement window. The operations of block 1405 may be performed according to the methods described herein. In certain examples, aspects of the operations of block 1405 may be performed by an access procedure component as described with reference to FIGS. 6 through 9.

At block 1410 the base station 105 may generate an SS burst comprising a plurality of SS blocks. The operations of block 1410 may be performed according to the methods described herein. In certain examples, aspects of the operations of block 1410 may be performed by a synchronization signal generator as described with reference to FIGS. 6 through 9.

At block 1415 the base station 105 may perform a beam sweeping first transmission of the SS burst over the shared radio frequency spectrum based on the access procedure. In some cases, each SS block of the SS burst is transmitted during the first transmission using a different transmission beam. In some cases, one of the first transmission, a second transmission by the base station, or a combination thereof comprises: a first indication of a time of access to the shared radio frequency spectrum band with respect to the measurement window, a second indication of a transmission beam associated with the SS block, and a third indication of a quantity of remaining SS blocks from the plurality of SS blocks to follow the SS block in the measurement window. The operations of block 1415 may be performed according to the methods described herein. In certain examples, aspects of the operations of block 1415 may be performed by a beam sweep component as described with reference to FIGS. 6 through 9.

Figure 15:
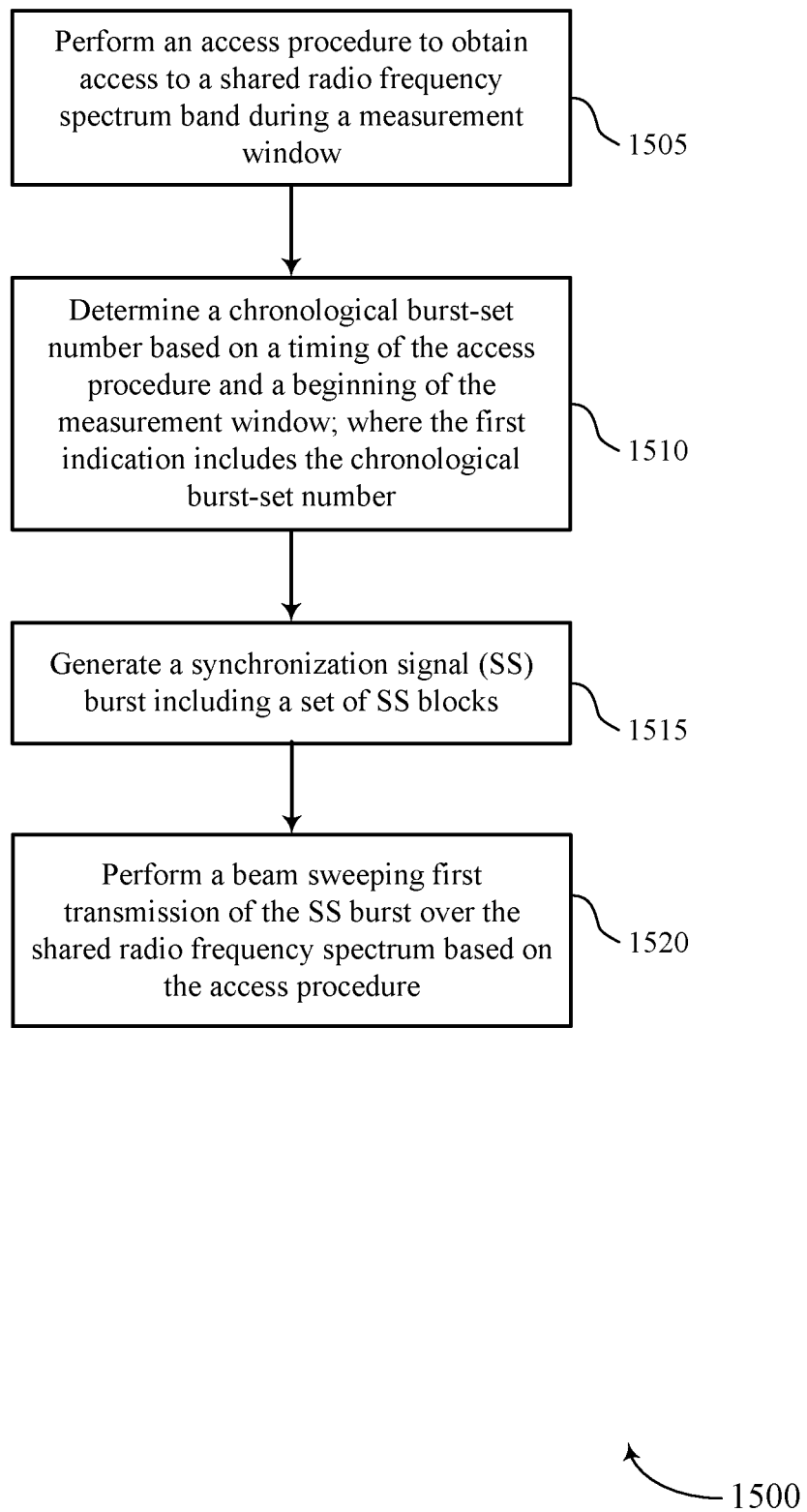

FIG. 15 shows a flowchart illustrating a method 1500 for synchronization signal block signaling for wireless communications in shared spectrum in accordance with aspects of the present disclosure. The operations of method 1500 may be implemented by a base station 105 or its components as described herein. For example, the operations of method 1500 may be performed by a base station synchronization signal manager as described with reference to FIGS. 6 through 9. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may perform an access procedure to obtain access to a shared radio frequency spectrum band during a measurement window. The operations of block 1505 may be performed according to the methods described herein. In certain examples, aspects of the operations of block 1505 may be performed by a access procedure component as described with reference to FIGS. 6 through 9.

At block 1510 the base station 105 may determine a chronological burst-set number based on a timing of the access procedure and a beginning of the measurement window. In some cases, the first indication may comprise of the chronological burst-set number. The operations of block 1510 may be performed according to the methods described herein. In certain examples, aspects of the operations of block 1510 may be performed by a burst-set numbering component as described with reference to FIGS. 6 through 9.

At block 1515 the base station 105 may generate an SS burst comprising a plurality of SS blocks. The operations of block 1515 may be performed according to the methods described herein. In certain examples, aspects of the operations of block 1515 may be performed by a synchronization signal generator as described with reference to FIGS. 6 through 9.

At block 1520 the base station 105 may perform a beam sweeping first transmission of the SS burst over the shared radio frequency spectrum based on the access procedure. In some cases, each SS block of the SS burst is transmitted during the first transmission using a different transmission beam. In some cases, one of the first transmission, a second transmission by the base station, or a combination thereof comprises: a first indication of a time of access to the shared radio frequency spectrum band with respect to the measurement window, a second indication of a transmission beam associated with the SS block, and a third indication of a quantity of remaining SS blocks from the plurality of SS blocks to follow the SS block in the measurement window. The operations of block 1520 may be performed according to the methods described herein. In certain examples, aspects of the operations of block 1520 may be performed by a beam sweep component as described with reference to FIGS. 6 through 9.

Figure 16:
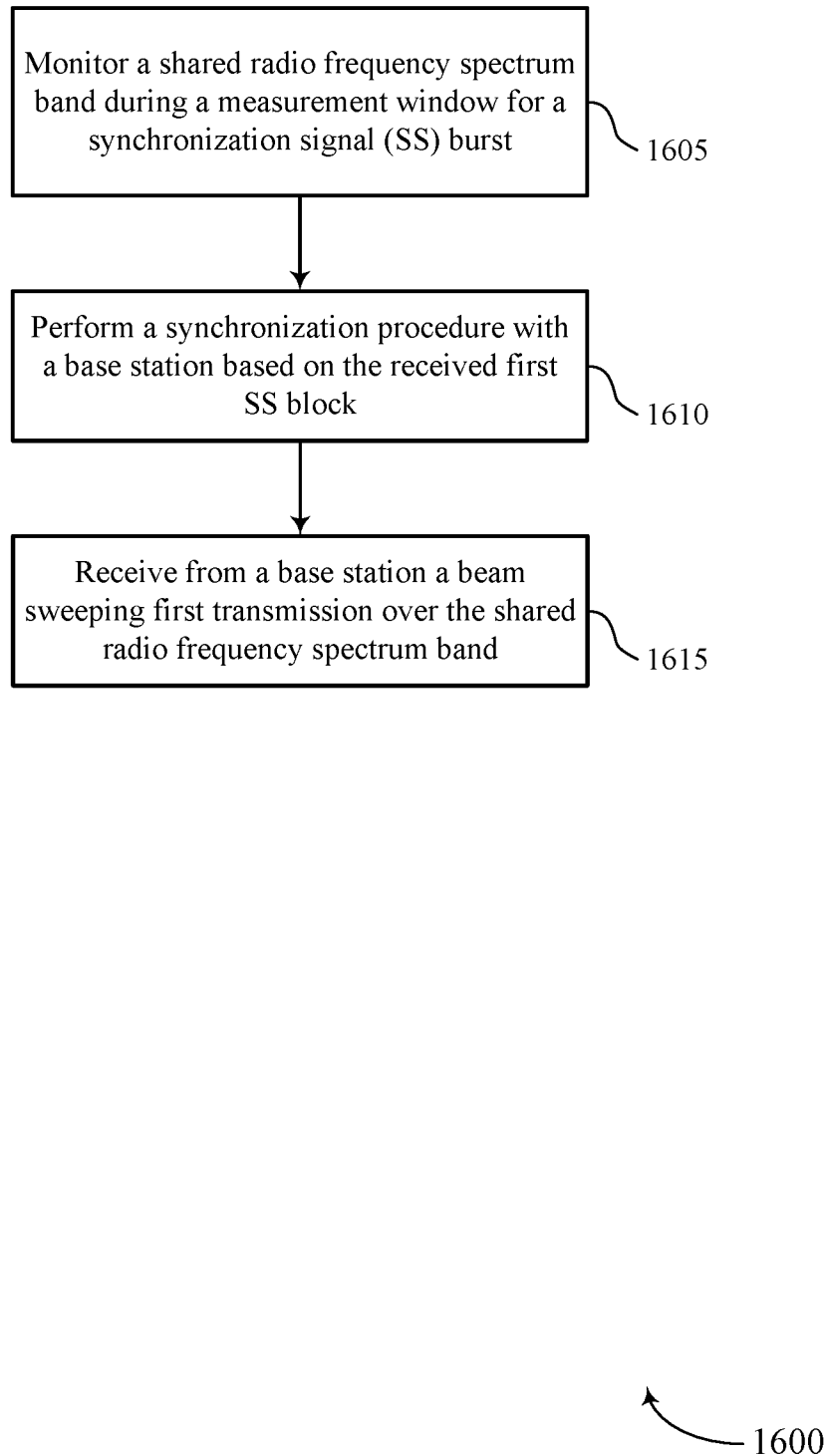

FIG. 16 shows a flowchart illustrating a method 1600 for synchronization signal block signaling for wireless communications in shared spectrum in accordance with aspects of the present disclosure. The operations of method 1600 may be implemented by a UE 115 or its components as described herein. For example, the operations of method 1600 may be performed by a UE synchronization signal manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may monitor a shared radio frequency spectrum band during a measurement window for an SS burst. The operations of block 1605 may be performed according to the methods described herein. In certain examples, aspects of the operations of block 1605 may be performed by a monitoring component as described with reference to FIGS. 10 through 13.

At block 1610 the UE 115 may perform a synchronization procedure with a base station based on the received first SS block. The operations of block 1610 may be performed according to the methods described herein. In certain examples, aspects of the operations of block 1610 may be performed by a synchronization component as described with reference to FIGS. 10 through 13.

At block 1615 the UE 115 may receive from a base station a beam sweeping first transmission over the shared radio frequency spectrum band. In some cases, the first transmission may comprise of an SS block of the SS burst. In some cases, one of the first transmission, a second transmission received from the base station, or a combination thereof comprises: a first indication of a time of access to the shared radio frequency spectrum band with respect to the measurement window, a second indication of a transmission beam associated with the SS block, and a third indication of a quantity of remaining SS blocks from the plurality of SS blocks to follow the SS block in the measurement window. The operations of block 1615 may be performed according to the methods described herein. In certain examples, aspects of the operations of block 1615 may be performed by a beam sweep component as described with reference to FIGS. 10 through 13.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
performing, by a base station, an access procedure to obtain access to a shared radio frequency spectrum band during a measurement window;
generating a synchronization signal (SS) burst comprising a plurality of SS blocks; and
performing, by the base station, a beam sweeping first transmission of the SS burst over the shared radio frequency spectrum based at least in part on the access procedure, wherein each SS block of the SS burst is transmitted during the first transmission using a different transmission beam;
wherein one of the first transmission, a second transmission by the base station, or a combination thereof comprises: a first indication of a time of access to the shared radio frequency spectrum band with respect to the measurement window, a second indication of a transmission beam associated with the SS block, and a third indication of a quantity of remaining SS blocks from the plurality of SS blocks to follow the SS block in the measurement window.

2. The method of claim 1, wherein transmitting the SS burst over the shared radio frequency spectrum band comprises transmitting all SS blocks of the SS burst during the measurement window.

3. The method of claim 1, wherein transmitting the SS burst over the shared radio frequency spectrum band comprises transmitting all SS blocks of a SS burst-set during the measurement window.

4. The method of claim 1, further comprising:
determining a chronological burst-set number based on a timing of the access procedure and a beginning of the measurement window; wherein the first indication comprises the chronological burst-set number.

5. The method of claim 1, wherein the first indication is constant for all SS blocks of the SS burst.

6. The method of claim 1, wherein the second indication comprises a beam index of the transmission beam.

7. The method of claim 1, further comprising:
determining a beam index of a sequentially first transmission beam used for a sequentially first SS block transmission after obtaining access to the shared radio frequency spectrum band, the beam index determined based at least in part on a timing of the access procedure and a beginning of the measurement window.

8. The method of claim 7, wherein the third indication comprises the beam index of the sequentially first transmission beam.

9. The method of claim 7, wherein the third indication is constant for all SS blocks of the SS burst.

10. The method of claim 1, wherein each SS block of the SS burst comprises a physical broadcast channel comprising one of the first indication, the second indication, the third indication, or a combination thereof.

11. The method of claim 1, wherein the second transmission comprises a minimum system information associated with the SS burst.

12. A method for wireless communications, comprising:
monitoring, by a user equipment (UE), a shared radio frequency spectrum band during a measurement window for a synchronization signal (SS) burst;
receiving from a base station a beam sweeping first transmission over the shared radio frequency spectrum band, the first transmission comprising an SS block of the SS burst; wherein one of the first transmission, a second transmission received from the base station, or a combination thereof comprises: a first indication of a time of access to the shared radio frequency spectrum band with respect to the measurement window, a second indication of a transmission beam associated with the SS block, and a third indication of a quantity of remaining SS blocks from the plurality of SS blocks to follow the SS block in the measurement window; and
performing a synchronization procedure with the base station based at least in part on the received first SS block.

13. The method of claim 12, wherein receiving the SS burst over the shared radio frequency spectrum band comprises receiving some SS blocks of the SS burst during the measurement window.

14. The method of claim 12, wherein the first indication comprises a chronological burst-set number based on a timing of an access procedure and a beginning of the measurement window.

15. The method of claim 12, wherein the first indication is constant for all SS blocks of the SS burst.

16. The method of claim 12, wherein the second indication comprises a beam index of the transmission beam.

17. The method of claim 12, wherein the third indication comprises a beam index of a sequentially first transmission beam used for a sequentially first SS block transmission in the burst.

18. The method of claim 17, further comprising:
determining the quantity of remaining SS blocks from the plurality of SS blocks to follow the SS block in the measurement window, based at least in part on the second indication and the beam index of the sequentially first transmission beam.

19. The method of claim 12, wherein the third indication is constant for all SS blocks of the SS burst.

20. The method of claim 12, wherein each SS block of the SS burst comprises a physical broadcast channel comprising one of the first indication, the second indication, the third indication, or a combination thereof.

21. The method of claim 12, wherein the second transmission comprises a minimum system information associated with the SS burst.

22. An apparatus for wireless communications, comprising:
a processor;
memory in electronic communication with the processor; and
instructions stored in the memory, wherein the instructions are executable by the processor to:
perform an access procedure to obtain access to a shared radio frequency spectrum band during a measurement window;
generate a synchronization signal (SS) burst comprising a plurality of SS blocks; and
perform a beam sweeping first transmission of the SS burst over the shared radio frequency spectrum based at least in part on the access procedure, wherein each SS block of the SS burst is transmitted during the first transmission using a different transmission beam;
wherein one of the first transmission, a second transmission, or a combination thereof comprises: a first indication of a time of access to the shared radio frequency spectrum band with respect to the measurement window, a second indication of a transmission beam associated with the SS block, and a third indication of a quantity of remaining SS blocks from the plurality of SS blocks to follow the SS block in the measurement window.

23. The apparatus of claim 22, wherein the instructions executable by the processor to transmit the SS burst over the shared radio frequency spectrum band comprise instructions executable by the processor to:
transmit all SS blocks of the SS burst during the measurement window.

24. The apparatus of claim 22, wherein the instructions are further executable by the processor to:
determine a chronological burst-set number based on a timing of the access procedure and a beginning of the measurement window; wherein the first indication comprises the chronological burst-set number.

25. The apparatus of claim 22, wherein the second indication comprises a beam index of the transmission beam.

26. The apparatus of claim 22, wherein the instructions are further executable by the processor to:
determine a beam index of a sequentially first transmission beam used for a sequentially first SS block transmission after obtaining access to the shared radio frequency spectrum band, the beam index determined based at least in part on a timing of the access procedure and a beginning of the measurement window, wherein the third indication comprises the beam index of the sequentially first transmission beam.

27. The apparatus of claim 26, wherein the third indication comprises the beam index of the sequentially first transmission beam.

28. The apparatus of claim 26, wherein the first indication and the third indication are constants for all SS blocks of the SS burst.

29. An apparatus for wireless communications, comprising:
a processor;
memory in electronic communication with the processor; and
instructions stored in the memory, wherein the instructions are executable by the processor to:
monitor, a shared radio frequency spectrum band during a measurement window for a synchronization signal (SS) burst;
receive from a base station a beam sweeping first transmission over the shared radio frequency spectrum band, the first transmission comprising an SS block of the SS burst; wherein one of the first transmission, a second transmission received from the base station, or a combination thereof comprises: a first indication of a time of access to the shared radio frequency spectrum band with respect to the measurement window, a second indication of a transmission beam associated with the SS block, and a third indication of a quantity of remaining SS blocks from the plurality of SS blocks to follow the SS block in the measurement window; and
perform a synchronization procedure with the base station based at least in part on the received first SS block.

30. The apparatus of claim 29, wherein the first indication comprises a chronological burst-set number based on a timing of an access procedure and a beginning of the measurement window, the second indication comprises a beam index of the transmission beam, and the third indication comprises a beam index of a sequentially first transmission beam used for a sequentially first SS block transmission in the burst.

* * * * *